(12) United States Patent
Swanson et al.

(10) Patent No.: US 6,203,639 B1
(45) Date of Patent: Mar. 20, 2001

(54) VEHICLE ASSEMBLY LINE-SIDE HEAT ACTIVATION OF A "READY-TO-INSTALL" WINDOW FIXING ADHESIVE FOR ATTACHMENT OF A VEHICLE WINDOW TO A VEHICLE

(75) Inventors: Douglas R. Swanson, Kentwood; David E. Nestell, Spring Lake; Niall R. Lynam, Holland, all of MI (US)

(73) Assignee: Donnelly Corporation, Holland, MI (US)

( * ) Notice: Subject to any disclaimer, the term of this patent is extended or adjusted under 35 U.S.C. 154(b) by 0 days.

(21) Appl. No.: 09/244,367

(22) Filed: Feb. 4, 1999

Related U.S. Application Data

(63) Continuation-in-part of application No. 09/024,226, filed on Feb. 17, 1998.

(51) Int. Cl.$^7$ .............................. B32B 31/12; E06B 7/00
(52) U.S. Cl. ................. 156/108; 156/272.2; 156/273.3; 156/309.9; 156/320; 156/322
(58) Field of Search ....................... 156/99, 108, 272.2, 156/273.3, 275.7, 309.9, 320, 322

(56) References Cited

U.S. PATENT DOCUMENTS

| | | |
|---|---|---|
| 1,813,425 | 7/1931 | Rosaire . |
| 3,347,729 | 10/1967 | Seefluth ............................... 156/380 |
| 3,388,945 | 6/1968 | Kevelin et al. ....................... 296/145 |
| 3,527,663 | 9/1970 | Rose et al. ............................ 161/45 |
| 3,542,619 | 11/1970 | McManus ............................ 156/275 |

(List continued on next page.)

FOREIGN PATENT DOCUMENTS

| | | |
|---|---|---|
| 2406340 | 10/1974 | (DE) . |
| 2352294 | 4/1975 | (DE) . |
| 3238651 | 4/1984 | (DE) . |
| WO9418255 | 8/1994 | (DE) . |
| 061183 | 9/1982 | (EP) . |
| 081426 | 6/1983 | (EP) . |

(List continued on next page.)

OTHER PUBLICATIONS

European Search Report for EP99650016.
English Abstract for WO 94/18255, Aug. 18, 1994, PCT.
German Abstract No. 3,124,138, dated Dec. 30, 1982.

(List continued on next page.)

*Primary Examiner*—Michael W. Ball
*Assistant Examiner*—Michael A Tolin
(74) *Attorney, Agent, or Firm*—Van Dyke, Gardner, Linn & Burkhart, LLP

(57) ABSTRACT

A method of preparing a vehicle panel assembly for attaching the panel to a vehicle is disclosed which provides a "ready-to-install" panel assembly. The panel assembly includes first and second spaced sides, with the bead of heat activated adhesive provided on the second side of the panel. The panel and bead are heated preferably by applying shortwave and longwave infrared radiation, with the shortwave infrared radiation being applied to an adhesive free side of the panel to heat the panel and, thereby, indirectly heat the bead of the heat activated adhesive. The longwave infrared radiation is applied to the adhesive side of the panel to directly heat the bead and thereby activate the adhesive. The ready-to-install adhesive may be applied on or adjacent to a gasket, such as a polyvinyl chloride (PVC) molding, a urethane molding, or the like. Optionally, either during or after heating, the substrate is cooled in order to ease handling of the panel assembly after the bead of adhesive is activate and ready for installation.

56 Claims, 13 Drawing Sheets

U.S. PATENT DOCUMENTS

| | | | |
|---|---|---|---|
| 3,573,149 | 3/1971 | Tibble et al. | 161/45 |
| 3,574,024 | 4/1971 | Rose | 156/108 |
| 3,645,817 | 2/1972 | Walker et al. | 156/108 |
| 3,654,005 | 4/1972 | Higgins et al. | 156/108 |
| 3,756,881 | 9/1973 | Denman | 156/108 |
| 3,867,222 | 2/1975 | Plant et al. | 156/107 |
| 4,039,720 | 8/1977 | Cherenko et al. | 428/425 |
| 4,110,148 | 8/1978 | Rocholl | 156/359 |
| 4,184,000 | 1/1980 | Denman | 428/347 |
| 4,391,663 | 7/1983 | Hutter, III | 156/64 |
| 4,455,186 | 6/1984 | Koehmstedt | 156/273.9 |
| 4,506,125 | 3/1985 | Smets et al. | 219/10.53 |
| 4,571,278 | 2/1986 | Kunert | 156/108 |
| 4,581,276 | 4/1986 | Kunert et al. | 428/157 |
| 4,704,175 | 11/1987 | Kunert et al. | 156/108 |
| 4,820,365 | 4/1989 | Brumm et al. | 156/109 |
| 4,910,071 | 3/1990 | Kunert | 428/192 |
| 4,933,032 | 6/1990 | Kunert | 156/108 |
| 4,938,521 | 7/1990 | Kunert | 296/96.21 |
| 4,950,348 | 8/1990 | Larsen | 156/275.3 |
| 5,035,045 | 7/1991 | Bowen et al. | 26/623.2 |
| 5,057,354 | 10/1991 | Kunert et al. | 428/192 |
| 5,061,332 | 10/1991 | Stolz et al. | 156/94 |
| 5,064,494 | 11/1991 | Duck et al. | 156/273.5 |
| 5,108,526 | 4/1992 | Cornils et al. | 156/108 |
| 5,151,149 | 9/1992 | Swartz | 156/379.8 |
| 5,234,730 | 8/1993 | Lautenschlaeger et al. | 428/34 |
| 5,329,094 | 7/1994 | Murphy et al. | 219/243 |
| 5,331,784 | 7/1994 | Agrawal et al. | 52/393 |
| 5,336,349 | 8/1994 | Cornils et al. | 156/107 |
| 5,421,940 | 6/1995 | Cornils et al. | 156/244.11 |
| 5,433,810 | 7/1995 | Abrams | 156/273.7 |
| 5,440,849 | 8/1995 | Agrawal et al. | 52/393 |
| 5,444,814 | 8/1995 | Hofuis, Sr. | 392/407 |
| 5,456,874 | 10/1995 | Cordes et al. | 264/138 |
| 5,507,994 | 4/1996 | Cornils et al. | 264/252 |
| 5,522,954 | 6/1996 | Bennett et al. | 156/64 |
| 5,554,325 | 9/1996 | Kotte et al. | 264/37 |
| 5,571,461 | 11/1996 | Scholl et al. | 264/40.5 |
| 5,591,528 | 1/1997 | Fisher et al. | 428/411.1 |
| 5,611,180 | 3/1997 | Agrawal et al. | 52/393 |
| 5,620,648 | 4/1997 | Volkmann et al. | 264/511 |
| 5,628,859 | 5/1997 | Janin et al. | 156/273.3 |
| 5,645,785 | 7/1997 | Corniles et al. | 264/252 |

FOREIGN PATENT DOCUMENTS

| | | |
|---|---|---|
| 209762 | 1/1987 | (EP) . |
| 364191 | 4/1990 | (EP) . |
| 371807 | 6/1990 | (EP) . |
| 585129 | 3/1994 | (EP) . |
| 603047 | 6/1994 | (EP) . |
| 843437 | 8/1960 | (GB) . |
| 1079446 | 8/1967 | (GB) . |
| 364191 | 4/1990 | (GB) . |

OTHER PUBLICATIONS

Japanese Abstract No. 58 194,513, dated Nov. 12, 1983.
Japanese Abstract No. 4,047,090, dated Dec. 17, 1992.
Japanese Abstract No. 3,119,081, dated May 21, 1991.
European Search Report for EP application Serial No. 99650016 corresponding to U.S. Patent Application Serial Nos. 09/244,367 and 09/024,226.

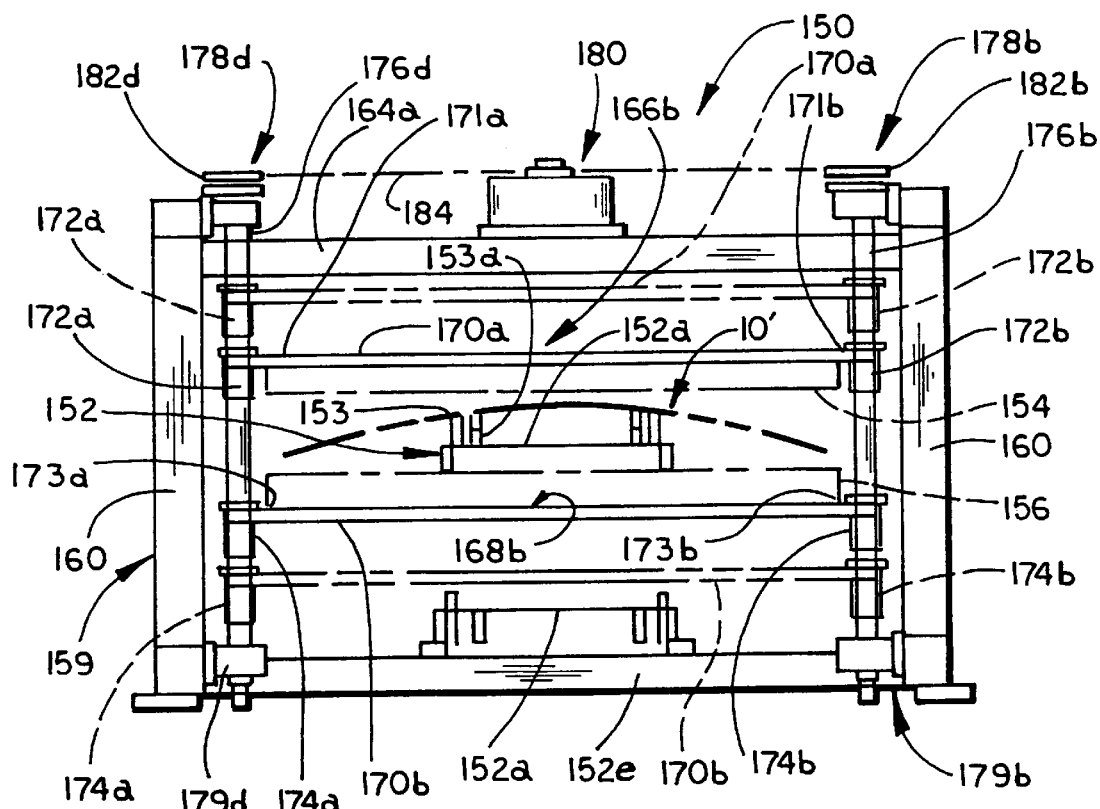
FIG.6
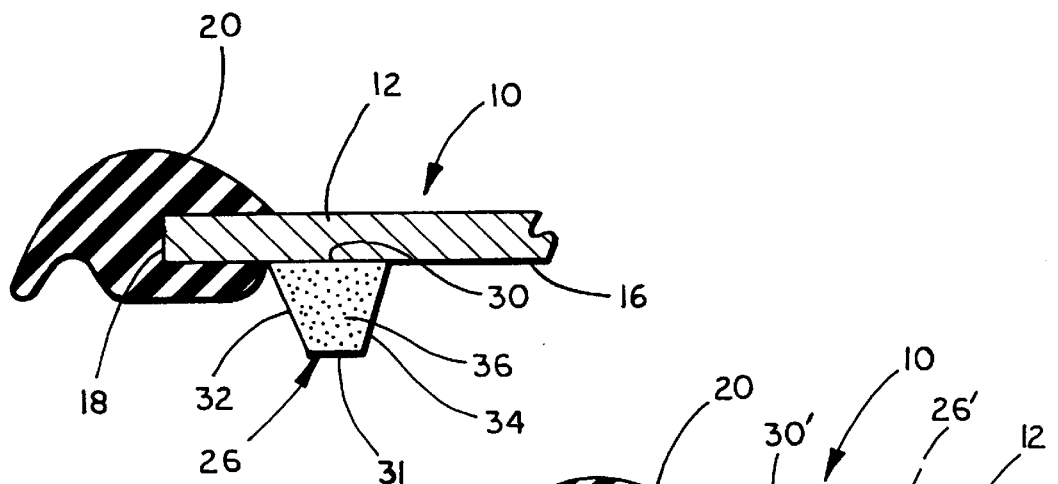
FIG.2A
FIG.2B

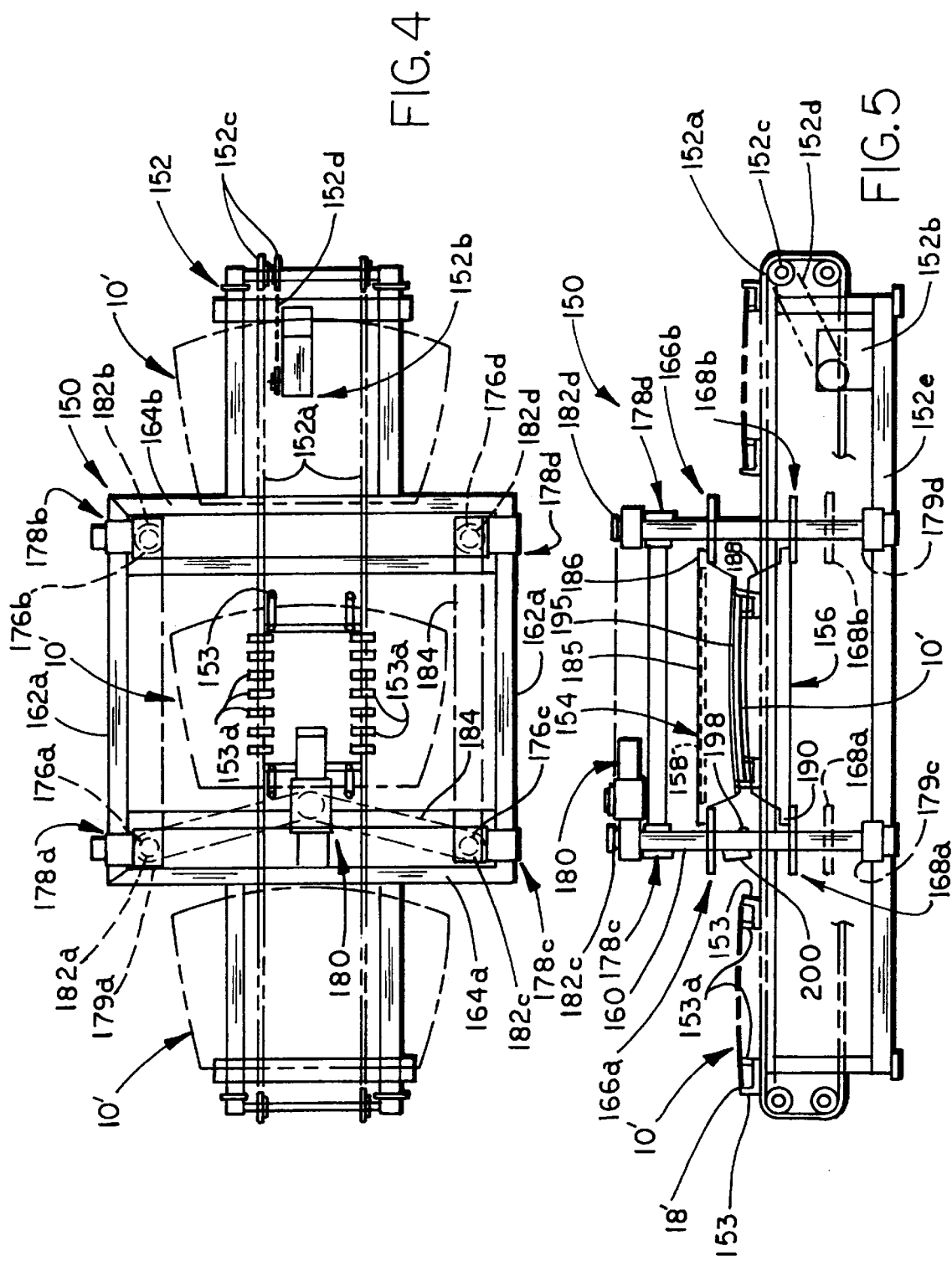

VEHICLE ASSEMBLY LINE-SIDE HEAT ACTIVATION OF A "READY-TO-INSTALL" WINDOW FIXING ADHESIVE FOR ATTACHMENT OF A VEHICLE WINDOW TO A VEHICLE

This is a continuation-in-part of pending patent application Ser. No. 09/024,226, filed Feb. 17, 1998, by Applicants Douglas R. Swanson, David E. Nestell, and Niall R. Lynam, which is incorporated herein in its entirety by reference.

TECHNICAL FIELD AND BACKGROUND OF THE INVENTION

This invention relates to vehicle panel assemblies and, more particularly, to vehicle panel assemblies which are mounted to a vehicle with an adhesive.

Conventional window assemblies are mounted to the vehicle body by an adhesive and often in combination with one or more fasteners which are mounted on the window panel or are embedded in a gasket which has been previously extruded or molded on to the window panel. The adhesive often provides the primary attachment to the vehicle and is applied to the surface of the panel, for example by extrusion, after priming of the substrate surface (typically a glass substrate) and/or the vehicle body (typically metal or a composite material). The window assembly is then pressed against the mounting flange or decking of the vehicle body to which the adhesive adheres after curing. Heretofore, these adhesives have been moisture cured, for example the moisture cure BETASEAL™ brand adhesive available from Essex Specialty Products of Auburn Hills, Mich. These moisture cure urethane adhesives, however, are currently applied at the vehicle assembly line and require either robotic application or hand application. Furthermore, the moisture cure adhesives require relatively long cure times-these adhesives typically take on the order of 120 minutes to cure sufficiently to develop the required "decking" strength to hold the window assembly in place. Consequently, the window assemblies installed in this manner may require temporary support while moving along the assembly line. Furthermore, the full strength of the adhesive requires a cure of about 24 to 72 hours, depending on environmental conditions. In addition, these cure periods are sensitive to the surrounding environment. Where the manufacturing plant is located in an area having low humidity, the cure time is significantly longer than in an area having high humidity. Consequently, standardizing such installations is difficult.

In addition to the relatively long cure time, the chemicals forming the adhesive and the adhesive primers require special handling. The adhesive must be contained in a very low moisture or moisture-free environment before application onto the glass panel to avoid premature curing. Furthermore, the adhesive and primer chemicals require special clean-up procedures and inventorying to assure full effectiveness of the adhesive. Moreover, these chemicals require proper ventilation, and the personnel handling the chemicals require protective gear. Consequently, in-vehicle-plant applications are labor intensive, increase assembly line-time, potentially increase the frequency of down-time when the adhesive is improperly applied, for example when the adhesive is dripped on other areas of the vehicle, and are, therefore, costly.

More recently, proposals have been made to control the curing process of the adhesive by covering the adhesive with a barrier film which is then subsequently peeled off the bead at the assembly line to allow installation and curing. One such example is disclosed in U.S. Pat. No. 4,933,032 to Kunert. Kunert '032 also proposes the use of heat or irradiation to actuate a multi-component polyurethane adhesive, which contains an initiating or reaction component in inactivated form, for example in the form of microcapsules, which are activated by the heat or irradiation before assembly of the glazing. While the removable barrier films and multi-component polyurethane adhesive theoretically remove the adhesive application process from the assembly line, numerous problems still remain. The extrusion and film application process is complicated, and the film can be vulnerable to tearing or damage during transportation. Furthermore, these films still require removal and disposal. Moreover, the barrier film must be accurately placed, otherwise, the exposed portions of the adhesive are prematurely cured and may be ineffective as a bonding agent.

The recent trend in vehicles is to produce a stream line or aerodynamic vehicle with larger windows to improve visibility. As a result the window assemblies often require compound curvatures. These compound curvatures make it hard to heat the panel uniformly. Furthermore, newer window panels include laminated substrates, moldings, and attachments which tend to degrade when subject to high temperatures. In order to heat such micro-capsule-containing adhesives over a period of time consistent with in-line processing, relatively high energy is required. In addition to possible degradation of the panel substrate, of the moldings, and of the attachments, the bead of adhesive is also subject to degradation if overheated. Perhaps for these and other reasons, heretofore, no "ready-to-install" window or panel assemblies have been successfully made or commercialized.

Consequently, there is a need for a "ready to install" panel assembly, for example a modular window, which can be quickly installed or "decked" in a vehicle or the like in an assembly line. Preferably, the modular window can be preassembled with an adhesive already applied at a location remote from a vehicle assembly plant to eliminate additional manufacturing time at the assembly line, handling of extra materials, on-line purging, which is required to eliminate unused portions of the moisture cured urethane in the dispenser nozzle, handling of chemistry in the vehicle manufacturing plant, including the adhesives and adhesive primers, and humidity control equipment and yet can be "decked" with the adhesive which is not activated until just prior to installation and which develops sufficient decking strength to hold the modular window in place.

SUMMARY OF THE INVENTION

Accordingly, the present invention provides a method of preparing a vehicle panel assembly for attaching the panel assembly to a vehicle. The vehicle panel assembly includes a substrate and a bead of ready-to-install heat activated adhesive. The substrate includes first and second sides. The bead of heat activated adhesive is applied to the second side of the panel. The panel is prepared by heating the first side of the substrate and by heating the outer skin portion of the bead such that the core portion of the bead reaches its activation temperature. In addition, after heating, the panel assembly is cooled to permit manual handling of the panel assembly.

In preferred forms, the panel assembly is cooled by directing air onto a portion of the substrate to cool the substrate to permit handling of the vehicle panel assembly. For example, the panel assembly may be cooled by blowing a gaseous stream onto the peripheral portion of the substrate preferably at an angle in a range of approximately 5° to 90°. For example, the gaseous stream may include air or an inert gas, such as argon or nitrogen or the like. In further forms, the gaseous stream is localized on the peripheral portion of the substrate to cool the substrate, for example by blowing the gaseous stream on the peripheral portion with a knife edge blower.

In other forms, the method of preparing the vehicle panel assembly further includes balancing the heating and the cooling to ensure that the central core portion of the bead at least reaches its heat activation temperature while cooling the substrate below 250° F. More preferably, the heating and cooling is balanced to ensure that the central core portion of the bead at least reaches its heat activation temperature while cooling the substrate below 175° F. Most preferably, the heating and cooling is balanced such that the central core portion of the bead at least reaches its heat activation temperature while cooling the substrate below 120° F. Preferably, the substrate is cooled to a desired temperature within fifteen minutes or less after heating, more preferably within about nine minutes or less after heating, and most preferably less than two minutes after heating. In addition, the method preferably includes balancing the heat on the first side and the heat on the second side to heat the central core portion to at least a heat activation temperature in a range of about 50° C. to 160° C. while maintaining an outer skin surface temperature at least no more than about 40° C. greater than the central core portion temperature and cooling substrate temperature below 120° F. within a period of about fifteen minutes or less after heating.

In preferred forms, the heating of the outer skin portion includes heating with longwave infrared radiation, for example with longwave infrared radiation with a thermal mass temperature in a range of about 450° F. to about 900° F. The first side of the substrate is preferably heated with shortwave infrared radiation.

In other forms, the cooling is initiated after the adhesive has reached a heat activation temperature.

According to another aspect of the invention, the vehicle panel includes a substrate and a bead of heat activated adhesive. The substrate has first and second sides and a peripheral portion, with the peripheral portion including a gasket which extends over at least a portion of the second side of the substrate. The bead of ready-to-install heat activated adhesive is applied to the gasket. In this aspect, the method of preparing the panel assembly includes heating the first side of the substrate adjacent gasket whereby the substrate heats the gasket to heat the interface portion of the bead and heating outer skin portion of the bead to thereby heat the central core portion of the bead and activate the ready-to-install heat activated adhesive.

In further aspects, the method includes cooling the substrate after heating the first side of the substrate and the outer skin portion of the bead. In one form, the substrate is cooled after the ready-to-install heat activated adhesive is activated.

According to yet another form of the invention, a method for preparing a vehicle panel assembly for attaching to a vehicle includes heating the vehicle panel substrate with a shortwave radiation source thereby heating the bead with a substrate through the bead's interface portion and heating the bead with a source of longwave infrared radiation whereby the core of the bead at least reaches an activation temperature. The method further includes cooling the substrate after heating the bead thereby permitting handling of the vehicle panel assembly after the bead of adhesive is activated.

In further forms, the cooling may be initiated after the core of the bead has reached its activation temperature, with the substrate being cooled to a desired temperature within 15 minutes or less after cooling is initiated, more preferably with the substrate being cooled within 9 minutes or less after cooling is initiated, and most preferably with the substrate being cooled within 2 minutes or less after cooling is initiated.

In other forms, the substrate is heated by positioning at least one heating shortwave infrared emitting lamp spaced from the first side of the substrate and aligning the lamp with the central axis. However, the lamps may be offset from the central axis less than twenty-four inches, more preferably less than twelve inches and most preferably less than one inch from central axis. The lamp is preferably spaced less than twenty-four inches from the first side of the substrate, more preferably, less than twelve inches, and most preferably less than three inches from the first side of the substrate.

In further forms, the bead is heated by positioning the source of longwave radiation spaced from the second side of the substrate, for example, preferably less than twenty-four inches from the second side of the substrate, more preferably less than twelve inches from the second side of the substrate and most preferably less than three inches from the second side of the substrate. Further, the source of longwave radiation is preferably aligned with the central axis of the bead. However, similar to the shortwave radiation source, the longwave radiation source can be offset from the central axis less than twenty-four inches, more preferably less than twelve inches, and most preferably less than one inch from the central axis.

The improved method disclosed herein provides a "ready-to-install" panel assembly, which is particularly suitable for window assemblies. The panel assembly is preassembled with a bead of heat activated adhesive extruded or otherwise applied on a second side of the panel substrate. The bead of adhesive is activated by the application of longwave and shortwave infrared radiation which are respectively applied to the bead of adhesive and to an opposed side of the panel substrate, which indirectly heats the bead. The panel substrate and other components, such as molded gaskets and the like, are protected from the shortwave infrared radiation by localizing the shortwave infrared radiation on a discrete portion of the first side of the substrate panel which is aligned with the bead of adhesive. In this manner, the bead of adhesive is quickly and uniformly heated without the associated degradation which often occurs with high energy heating. Further, the panel assembly is cooled to permit manual handling of the panel assembly soon after the assembly has been heated and the adhesive has been activated.

These and other objects, advantages, and purposes and features of the invention will become more apparent form a study of the drawings, specification, and claims which follow.

DESCRIPTION OF THE DRAWINGS

FIG. 2A is an enlarged fragmentary view of a peripheral portion of one of the panel assemblies to be heated;

FIG. 2B is an enlarged fragmentary view similar to FIG. 2A illustrating the panel assembly installed in an opening of a vehicle;

FIG. 4 is a plan view of a preferred embodiment of the heater assembly of present invention positioned in-line for heating panel assemblies transported on a conveyor;

FIG. 5 is a side elevation of the preferred heater assembly of FIG. 4;

FIG. 6 is an end elevation of the preferred heater assembly of FIG. 4;

DESCRIPTION OF THE PREFERRED EMBODIMENTS

Figure 1:
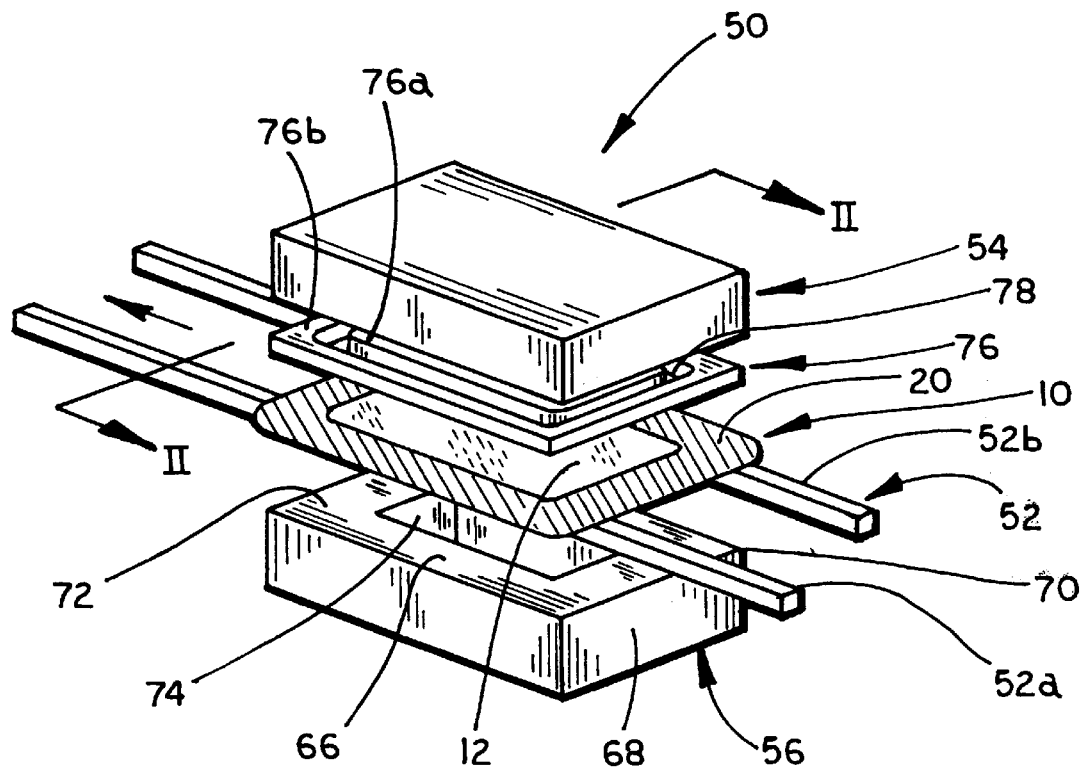
FIG. 1 is a perspective schematic view of a heater assembly of the present invention positioned along a conveyor which transports panel assemblies to be heated.

Referring to FIGS. 1, 2, 2A and 2B, a panel assembly 10, for example a modular window assembly, which is heated by the apparatus and method of the present invention includes a substrate panel or sheet 12, which may comprise plastic or glass, preferably substantially transparent glass, for example tempered, laminated, or glass which is otherwise strengthened using conventional techniques. Furthermore, panel 12 may comprise a multi-laminate panel, for example, of plastic and glass sheets. In addition, panel 12 may comprise a large window, such as a window having a surface area of at least about 250 square inches or such as a window with a surface area of at least about 500 square inches. Optionally, panel 12 may be a curved panel (such as a curved panel having a compound curvature) with a concave surface on which is disposed the ready-to-install adhesive and on which are disposed other heat vulnerable attachments, such as polymeric gaskets, studs, bezels, and the like. Alternately, panel assembly 10 can be a decorative assembly with panel 12 being translucent or opaque instead of transparent. Panel 12 has two substantially parallel sides or surfaces 14 and 16 and a peripheral edge 18. Panel 12 may include an opaque, preferably black, frit layer which extends around peripheral edge 18 and, optionally, is encapsulated with a molded member, for example a polymeric gasket 20 on at least one side 14 or 16 of panel 12.

In the illustrated embodiment, panel 12 includes a three sided polymeric gasket molded thereon. Thus, gasket 20 extends around three (3) sides of panel 12, namely, surfaces 14, 16 and edge 18. It should also be understood that panel 12 may be free of any gasket or may include a single sided or two sided gasket. Gasket 20 may be formed using a variety of techniques, including reaction injection molding (RIM) of thermosetting polymeric material, such as polyurethane, or a thermoplastic polymeric material which, for example, is injection molded such as polyvinyl chloride (PVC), a thermoplastic urethane, or a thermoplastic elastomer (including an ethylene-styrene interpolymer formed from a melt-processible, low halogen free polymer resin material, such as a resin based on polyolefin and produced using a metallocene catalyst and having a durometer within a range of about 30 to 110 on the Shore A scale, more preferably about 65 to 95 Shore A, and most preferably 65 to 85 Shore A, for example, one preferred form of an ethylene-styrene interpolymer is available from DOW Chemical, Freeport, Tex., and which, preferably, utilizes DOW's INSITE single-catalyst technology, wherein depending on the amount of styrene incorporated, the solid state of the polymer can exhibit a variety of structures and durometer hardnesses, including semi-crystalline and amorphous rubber such as described in pending U.S. patent application entitled VEHICULAR WINDOW ASSEMBLY, filed by Qihua Xu and David E. Nestell, now U.S. Pat. No. 6,089,646, and assigned to Donnelly Corp. of Holland, Mich., the disclosure of which is incorporated herein by reference in its entirety), and other applications, such as extrusion or post attachment grommets. In addition, gasket 20 may include one or more fasteners (not shown) embedded in the gasket or secured to the panel adjacent the gasket for securing components to panel assembly 10 or securing panel assembly 10 to the vehicle or the like.

Referring to FIG. 2A, a bead 26 of a heat activated adhesive is extruded or otherwise applied, including post-applied, onto the peripheral portion of the inside surface 16 of panel 18. In the illustrated embodiment, bead 26 includes a generally quadrilateral-shaped cross section with a wide base 30 defining an interface portion or region and a side 31 defining a generally outer extremity portion or region, which is formed by converging sides 32 and 34 such as shown in FIG. 2A. Sides 31, 32 and 34 define a bead skin or outer surface portion or region. Intermediate sides 31, 32 and 34 and base 30 is a central portion or region or core 36. It should be noted that bead 26 may also be dispensed or otherwise applied on a gasketed portion of panel 12 and may assume other shapes, with the apparatus and method of this invention being equally suitable for activating the adhesive bead in either position.

Adhesive bead 26 is preferably extruded or otherwise applied onto panel 12 at a "just-in-time" plant close to but a distance from the vehicle production plant for a "ready-to-install" and/or "sequenced" installation. Consequently, when panel assembly 10 is transported, panel assembly 10 is preferably transported with the adhesive bead positioned or orientated face down so that adhesive bead 26 will be protected by substrate panel 12 during transportation. When delivered to the vehicle assembly plant, panel assembly 10 is heated by a heater assembly 50. As best seen in FIG. 2B, a second embodiment 26' of heat activated adhesive bead is shown. Bead 26' includes a generally triangular-shaped cross section with a wide base 30' defining an interface portion or region and a generally pointed outer extremity portion or region 31', which is formed by converging sides 32' and 34'. Outer extremity 31' and sides 32' and 34' define a bead skin or outer surface portion or region of bead 26', with a central core portion 36' being defined between sides 32' and 34' and between outer extremity 31' and interface portion 30'. After heating, panel assembly 10 is installed in an opening 40 of a vehicle, and adhesive bead 26' is compressed against a mounting flange or deck 42, which extends around opening 40 to adhere panel assembly 10 to the vehicle body, with the adhesive characteristics of adhesive bead 26' having been activated by the heater assembly 50 and method of heating, each of which will be more fully described below.

Referring to FIG. 1, heater assembly 50 of the present invention is shown positioned along a conveyor 52 which transports panel assemblies 10 for installation in a vehicle or the like. Conveyor 52 is of conventional design and includes spaced apart conveyor belts or chains 52a and 52b, which support panel assemblies 10 inwardly of their respective outer edges. Conveyor belts 52a and 52b are driven by a conventional drive system (not shown) as would be understood by those skilled in the art. Heater assembly 50 includes a first or upper heating component 54 and a second or lower heating component 56 which are positioned on opposed sides of panel assembly 10 and conveyor belts 52a and 52b. Heating component 54 is positioned above panel assembly 10 for heating surface 14, the adhesive-free side of panel 12 and is, preferably, adapted to heat a perimeter portion of surface 14 of panel 12 which corresponds and is aligned with bead 26 or 26'. Heating component 56, on the other hand, is positioned below panel assembly 10 and conveyor belts 52a and 52b and is adapted to heat side 16 and, more specifically, to heat bead 26 or 26'.

Heating component 54 provides heat energy to side or surface 14 of panel assembly 10 and preferably includes a shortwave infrared radiation source such as a plurality of shortwave infrared emitting lamps 58 (FIG. 2), for example the high density tubular quartz (T3) tungsten filament lamps which are available from Research, Inc. of Minneapolis, Minn. Lamps 58 preferably emit peak radiation of less than about 2.5 microns. More preferably, lamps 58 emit a peak radiation in about the 0.6 to 2.5 micron region of the infrared spectrum. More preferably, lamps 58 emit peak radiation of less than about 1.0 micron. In the illustrated embodiment, lamps 58 are preferably supported in a housing 59 and are arranged in a generally parallel spaced apart relationship to the panel assembly 10. In addition, lamps 58 are preferably equally spaced to provide a uniform application of heat to the perimeter portion of substrate panel 12. Alternately, lamps 58 may be arranged in a non-uniform manner to accommodate the topology of the panel assembly, for example a curved panel assembly, including a curved panel assembly with a compound curve. Furthermore, lamps 58 are preferably removably mounted in housing 59 and can be reconfigured and rearranged in housing 59 to accommodate variations in the shape and size of the panel assemblies.

Figure 2:
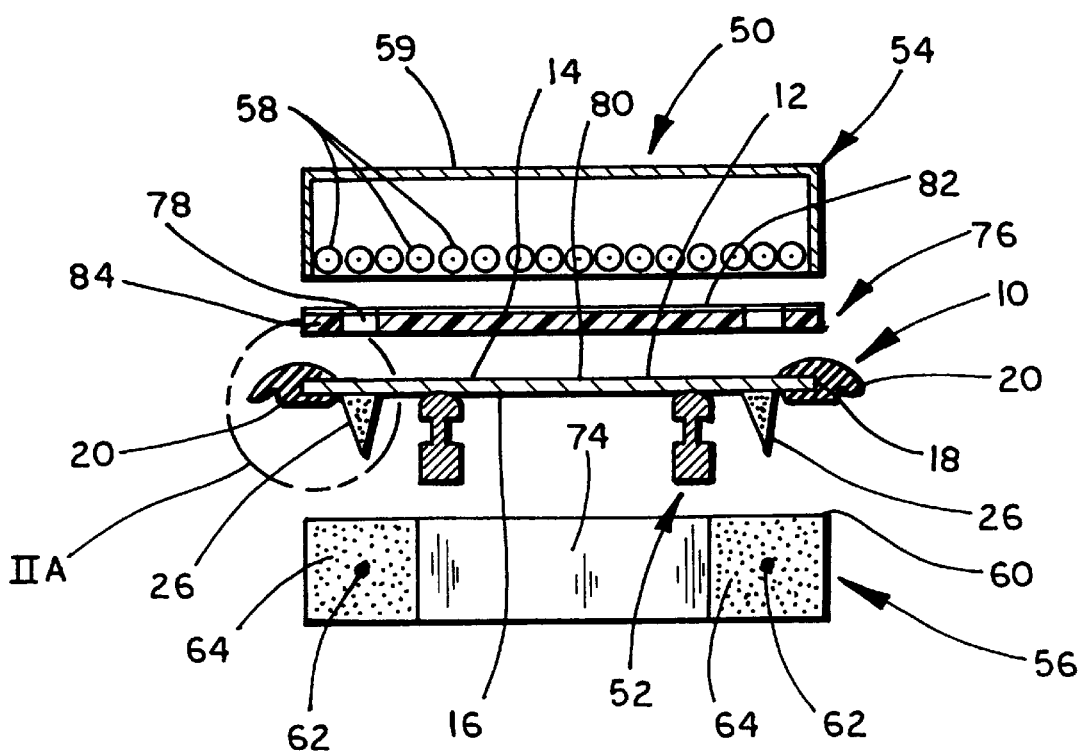
FIG. 2 is a cross-section of the heater assembly taken along line II—II of FIG. 1 including a first embodiment of a heat localizer.

In contrast, second heating component 56, which provides heat energy to bead 26 or 26', preferably comprises a longwave infrared heater and includes a longwave infrared radiation source, such as a quartz emitter 60 (FIG. 2). Quartz emitter 60 preferably emits a peak radiation greater than about 2.5 microns in the infrared spectrum. More preferably, second heating component 56 emits a peak radiation in a range of about 2.5 to 8.0 microns. Most preferably, second heating component 58 emits peak radiation in a range of about 2.5 to 6.0 microns. Quartz emitter 60 includes one or more heating elements 62 which are embedded in a fused quartz medium or substrate 64 and is commercially available from Casso Solar of Pomona, N.Y. Alternately, heating component 56 may apply hot air to panel 12 and bead 26 or 26' to heat bead 26 or 26'. Preferably, the hot air is directed onto the bead, with the central portion of the panel 16 and heat sensitive attachments avoiding degradation. In another form, heating component 56 may comprise a black body radiator that emits infrared radiation in response to the shortwave infrared radiation emitted by lamps 58. For example, heating component 56 may comprise a fused quartz body which would emit longwave infrared radiation.

In the illustrated embodiment, heating component 56 preferably comprises a perimeter heater, as shown in FIG. 1, having heat emitting portions or sections 66, 68, 70, and 72 which are aligned with adhesive bead 26 on panel 12 and, preferably, includes a non-heat emitting central portion or opening 74 so that the heat which is emitted from second heating component 56 is substantially localized at the adhesive bead 26 rather than the entire panel assembly 10. Alternately, heating component 56 may be provided with a heat director, such as a heat shield which localizes the heat on bead 26 and is adapted to shield or mask the central portion 80 and molded gasket 20 to protect substrate panel 12 and molded member 20 from degradation.

As described above, first heating component 54 is positioned above panel assembly 10 so that the heat emitted from lamps 58 is directed to the adhesive-free-side of panel 12. Furthermore, in order to localize the heat from lamps 58 onto the portion of surface 14 of panel 12 which corresponds to or is aligned with adhesive bead 26, heater assembly 10 further preferably includes a heat localizer, for example a heat shield 76. Heat localizer 76 is interposed between first heating component 54 and panel assembly 10 and includes a perimeter opening 78 which corresponds to the perimeter portion of upper surface 14 corresponding to and aligning with bead 26. In this manner, the heat from lamps 58 is localized on the glass side of bead 26, and the heat sensitive components, such as molded member 20 which tend to degrade under high temperatures such as those associated with activation of adhesive 26, are shielded from the shortwave infrared radiation emitted from lamps 58. In addition, heat shield 76 shields or masks the central portion 80 of panel 12 to avoid introduction of cracks and delamination. Furthermore, by shielding or masking the central portion of panel, panel assembly 10 is easier to handle.

Referring to FIG. 2, heat shield 76 includes a reflective surface 82 to direct the heat away from molding 20 and central portion 80 of panel assembly 10. For example, reflective surface element 82 may comprise a polished metal sheet backed with an insulating substrate 84, which together minimize the amount of heat transmitted from first heating component 54 to molded member 20 and central portion 80 of panel assembly 10. In addition, heat shield 76 may include an air gap between reflective surface element 82 and plastic substrate 84 which increases the dissipation of heat and, therefore, improves the shielding of the respective heat sensitive components of panel assembly 10. Alternately, heat shield 76 may comprise a ceramic or a metal coated or reflector clad ceramic. Furthermore, shield 76 may comprise a double pane shield, for example an aluminum double pane with preferably, a gaseous layer, such as of air or an inert gas, such as argon or nitrogen or the like, or an insulating material, such as fiberglass or xerogel or the like, between the panes serving as an insulator. Moreover, shield 76 may be substantially opaque or may be only partially opaque so as to, optionally, provide restricted heating of the shielded window panel region (so as to avoid thermal differences between the shielded region and the perimeter unshielded region and, thus, alleviate thermal stresses). For example, shield 76 can comprise a panel (such as of a specialized near infrared absorbing glass) that is only partially transmitting to shortwave infrared radiation (for example, is less than 50% transmitting). Also, shield 76 can have a gradient in its thermal transmission property with its outer edge regions being, preferably, substantially opaque and its more central regions being less opaque, i.e. more partially opaque. Thus, shield 76 can be a gradient heat shield that heats the central window panel regions least (distal from the panel edge region where the bead 26 is generally disposed) and that heats the window panel more t the edge regions closer where the bead 26 is disposed. Such a gradient heat shield can obviate thermal stresses between the shielded and unshielded regions of the window panel, while providing adequate heat shielding to protect any heat vulnerable attachments to the window panel, or protect any laminating materials used. For example, shield 76 can comprise a near infrared radiation absorbing glass panel that transmits less than about 10% of incident shortwave infrared radiation at its center regions, but that transmits greater than about 70% incident shortwave infrared radiation at its edge regions, thus acting as a gradient heat shield for the window panel. Furthermore, the outer perimeter portion 76b of the shield may have a higher shielding efficiency than central portion 76a. In this manner, the thermal gradient across panel 10 may be balanced to control the thermal stresses in the panel due to the localized heating.

Preferably, shield 76 is supported by housing 59 of first heating component 54, for example by conventional fasteners and the like, with the central portion 76a being supported independently from the perimeter portion 76b of shield 76 to assure that opening 78 remains unobstructed.

Figure 2C:
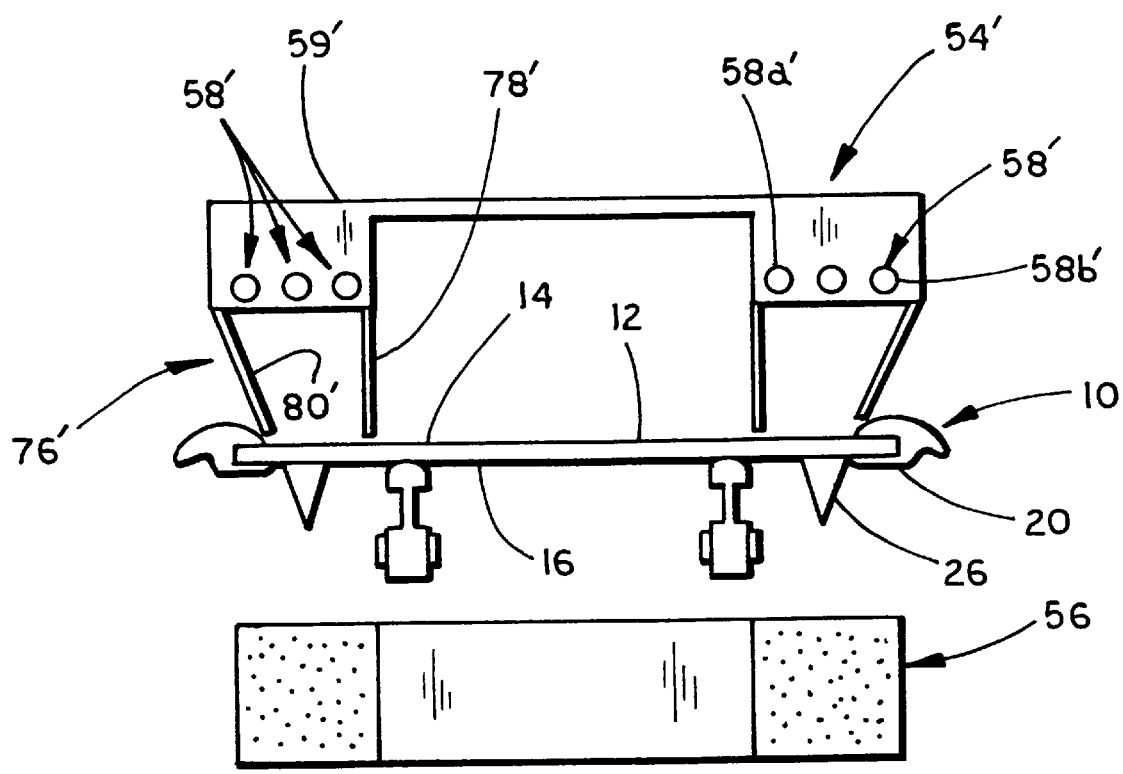
FIG. 2C is a cross-section similar to FIG. 2 illustrating a second embodiment of a heat localizer.

Referring to FIG. 2C, a second embodiment of heating component 54' and heat localizer 76' are shown. Heating component 54' comprises a perimeter shortwave heater and includes lamps 58', which are arranged to form a perimeter heater such that lamps 58' are generally aligned over the portion of upper side 14 of panel assembly 10 which is aligned with bead 26. Heat localizer or director 76' includes an inner heat directing member 78' and an outer heat directing member 80' which are aligned to direct the heat from lamps 58' onto the localized or discrete peripheral portion of the upper side 14 of panel assembly 10 which is aligned with bead 26. Inner heat directing member 78' is preferably supported on housing 59' inwardly of the innermost lamp 58a'. Outer heat directing member 80', on the other hand, is supported on housing 59' outwardly of outermost lamp 58b' so that substantially all the infrared radiation emitted from lamps 58' is directed between inner and outer heat directing members. Preferably, outer heat directing member 80' is canted or slanted inwardly so that the heat from lamps 58' is localized or focused on that portion of the upper side 14 of panel assembly 10. Optionally, heat localizer or director 76' may include intermediate heat directers (not shown) which extend from housing 59' between inner and outer heat directers 78' and 80'. In this manner, increased control over the applied heat may be obtained when lamps 58' are individually controlled. Furthermore, heat director members 78' and 80' may comprise annular members or, optionally, may each comprise a plurality of overlapping segmented members, whose position or orientation can be adjusted by varying the degree of overlap between each of the individual segmented members.

It can be appreciated from the foregoing that the shortwave infrared radiation emitted from lamps 58 heats a localized or a discrete portion of substrate panel 12, which in effect becomes a heat source for bead 26, and heats bead 26 through interface surface 30 between panel 16 and bead 26. On the other hand, the longwave infrared radiation emitted from heater assembly 56 directly heats bead 26 and, more specifically, heats outer skin surfaces 32, 34 and outer extremity portion 31 of adhesive bead 26. Together, shortwave heating component 54 and longwave heating component 56 uniformly heat adhesive bead 26 so that its central core portion 36 achieves the desired temperature without over heating the skin or outer surface portion and, more significantly, its outermost extremity portion. It should be understood from the foregoing that the geometry of bead 26 may result in bead 26 having at least three temperatures, for example, a bead core temperature, a bead skin surface temperature, and a bead interface temperature. Depending on the balance of the shortwave and longwave infrared radiation, these three temperatures may vary considerably. Desirably, in order to activate the adhesive properties of bead 26, the core portion 36 is heated sufficiently to at least its minimum activation temperature while the interface and outer skin surface temperatures are preferably maintained below the adhesive degradation temperature.

Preferably, adhesive bead 26 comprises a heat activated adhesive which has a minimum activation temperature of at least about 50° C. to 60° C. to provide a safety margin against unintentional activation, such as during shipment from a remote ready-to-install window facility to a vehicle assembly plant. More preferably, adhesive bead 26 has a minimum activation temperature of at least about 80° C., and even more preferably has a minimum heat activation temperature of less than about 120° C. Most preferably, adhesive bead 26 has a minimum heat activation temperature in a range of about 80° C. to 110° C. For example, however, where the window panel is such as a laminated windshield or side window or backlite comprising two glass sheets laminated with a polymer inner layer, such as plasticized polyvinyl butyryl, or silicone or the like, it is preferable that the activation temperature of the adhesive be less than or equal to about 150° C., more preferably less than or equal to about 125° C., and most preferably less than or equal to about 105° C. Also, when a ready-to-install adhesive is applied on or adjacent to a gasket such as a polyvinyl chloride (PVC) molding, a urethane molding, an elastomeric molding or the like, it is preferable that the heat activation temperature of the adhesive be about less than or equal to 125° C., more preferably less than or equal to about 115° C., and most preferably less than or equal to about 105° C. In addition, the adhesive bead 26 preferably has a maximum activation temperature less than about 160° C., more preferably, less than about 130° C., and most preferably less than about 120° C. When activated, the core temperature of adhesive bead 25 is, preferably, in a range of about 50° C. to 160° C., more preferably in a range of about 70° C. to 120° C., and most preferably in a range of about 80° C. to 110° C. In order to control and, more preferably, eliminate degradation of the bead material, the shortwave and longwave infrared heaters are controlled and/or balanced so that the bead skin surface temperature at the bead's skin or outer surface portion or region and/or at least a portion of the bead's skin or outer surface portion, does not exceed the temperature of the central core portion of the bead more than about 40° C., more preferably, more than about 20° C., and most preferably more than about 10° C. For example, the bead surface temperature is preferably maintained less than about 170° C., more preferably less than about 140° C., and most preferably less than about 120° C. While no maximum dwell times are required, in order to provide a process suitable for coordination with production line assembly, heater 50 preferably heats bead 26 to its activation temperature in less than about ten minutes, more preferably, in less than about five minutes, and most preferably, in less than about two minutes. In some applications, heater 50 may heat bead 26 to its activation temperature in a range of about 5 seconds to about 20 seconds, provided that the core of bead 26 reaches its desired activation temperature and is uniformly heated.

A preferred heat activated adhesive preferably comprises an adhesive forming resin such as urethane resin, polyether resin, acrylic resin, oxyalkylene resin, vinyl resin, or a similar adhesive forming resin. The adhesive may include latent accelerants and/or catalysts (such as organo metallic catalysts such as tin catalysts) and the like that are heat activated at line-side and/or are formed when exposed to heat above a suitable threshold temperature, including for example monomeric or oligomeric or partially polymerized precursors of window fixing adhesives, such as of urethane, polyether, oxyalkylene, acrylic, vinyl adhesives and the like. Such latent accelerants and/or catalysts can be microencapsulated or can be formed through the heat activation of the adhesive composition. Once so activated, the window fixing adhesive is suitable for securing panel assembly 10 to the vehicle. More preferably, the ready-to-install adhesive is an activatable resin composition, for example, an oxyalkylene polymer having in its structure at least one silicon-containing group which bears a hydroxyl or hydrolyzable group bonded to the silicon atom and which can cross-link through the condensation of silanol. Preferably, the resin further includes carbon black and an oxyalkylene polymer free from any cross-linking group as well as latent accelerants and/or catalysts, stabilizers and the like. In such manner, the ready-to-install heat activated adhesive is preferably not activated until panel assembly 10 is line-side, and is dispensed onto the panel at the remote RTI window plant, and shipped to the vehicle assembly plant, in an uncured or only partially cured and/or in an unformed or only partially formed state.

Figure 3A:
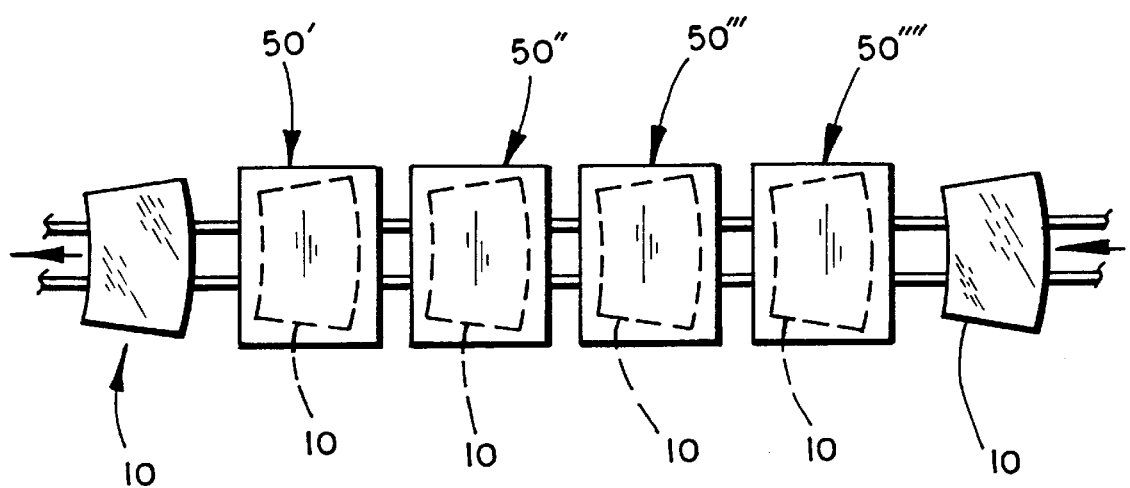
FIG. 3A is a plan view of a multi-stage heater assembly arrangement of the present invention aligned along an assembly line conveyor.
Figure 3B:
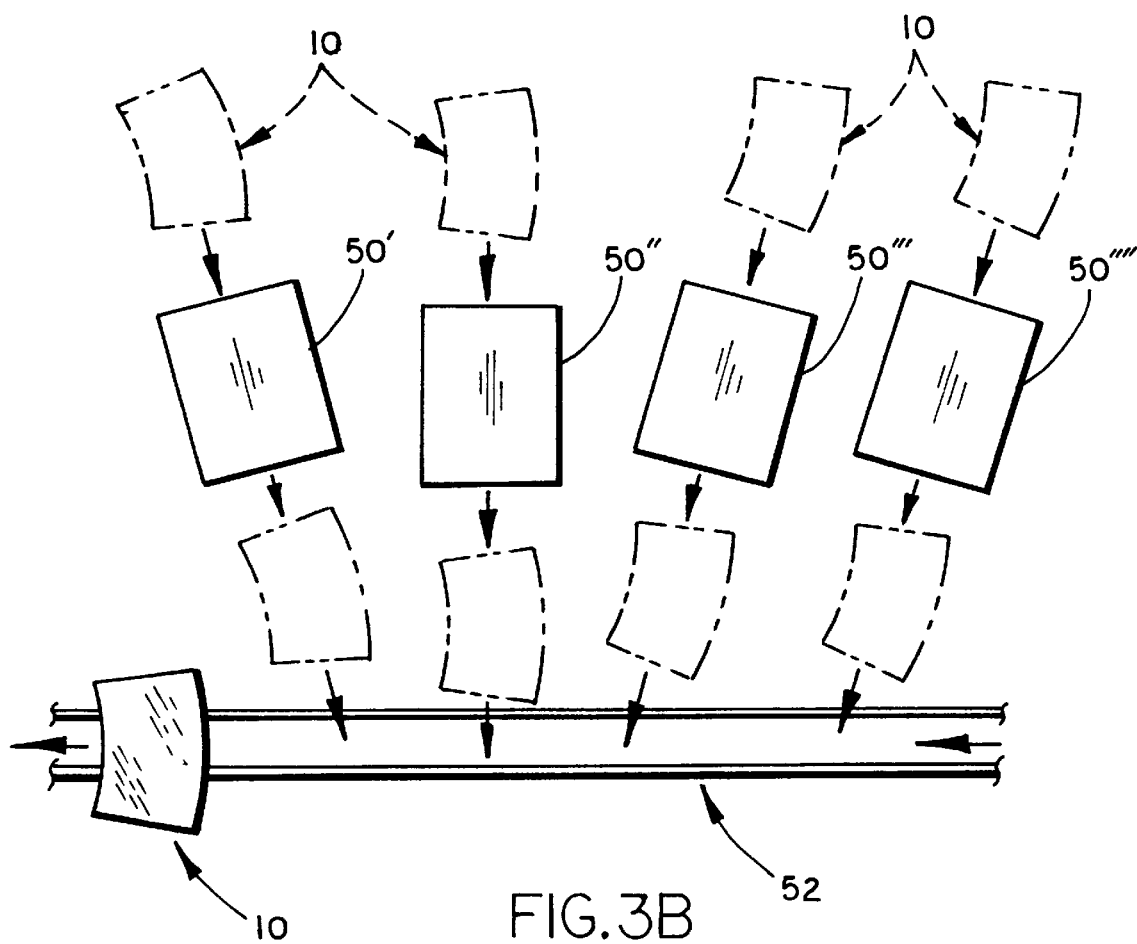
FIG. 3B is a plan view of a second embodiment of a multi-stage heater arrangement of the present invention positioned adjacent an assembly line conveyor.

As shown in FIG. 3A, in order to accommodate the conveyor speed, multiple heating stages having first, second, third, and fourth stage heaters 50', 50", 50''', and 50'''' arranged in series can be used in which adhesive bead 26 is heated, for example in thirty to sixty second stages until the final temperature has been reached. Heaters 50'–50'''' are preferably of similar construction to heater assembly 50 and, therefore, reference is made to that assembly for further details of each heater 50', 50", 50''' or 50''''. The heating times and durations vary depending on the type of substrate panel whether glass and/or whether tempered or laminated, due to the differences in thermal conduction. Alternatively, as best seen in FIG. 3B, first, second, third, and fourth heaters 50', 50", 50''', and 50'''' may be positioned adjacent conveyor 52. In this arrangement, panel assemblies 10 are delivered to heaters 50', 50", 50''', and 50'''' and, after heating, are moved from heaters 50', 50", 50''', and 50'''' for placement on conveyor 52. In this arrangement, panel assemblies 10 are inserted in the respective heaters 50', 50", 50''', and 50'''' at different and successive times so as to allow sufficient dwell times for each assembly so that heated assemblies are available when needed as successive vehicles pass along the assembly line. Thus, in contrast to the heaters arranged in series over conveyor 52, stage heaters 50', 50", 50''', and 50'''' preferably operate out of phase so that when a panel assembly 10 is heated to its activation temperature, the panel assembly may be removed from the respective heater and immediately placed on conveyor 52 without delay for subsequent installation into a vehicle. For example, where conveyor indexes every 60 seconds, stage heaters 50', 50", 50''', and 50'''' would preferably operate out of phase by 60 seconds.

Referring to FIGS. 4–6, a preferred embodiment 150 of the heater assembly is shown. Heater assembly 150 includes a first or upper heating component 154 and a second or lower heating component 156, which are respectively positioned above and below panel assembly 10', which is supported on a conveyor 152, and are adapted to move from a holding or non-heating position to a heating position, as will be more fully described below. Conveyor 152 is a conventional conveyor and includes a conveyor belt 152a which is driven by a conventional drive system. The drive system includes a gear box and motor 152b which is coupled to belt drive sprockets 152c by a drive chain 152d, all of which are supported by a conveyor frame 152e. Panel 10' is supported on conveyor 152 by a pair of locator members 153 which support panel 10' above and spaced from conveyor belt 152a with holders 153a which support panel assembly 10' inwardly of its outer periphery 18'. Locator members 153 are secured to conveyor belt 152a and are grouped in pairs which are sufficiently spaced apart along belt 152a so that only one panel at a time is positioned in heater 150. Panel assembly 10' may be of similar construction to panel assembly 10 and, therefore, for further details of panel assembly 10', reference is made to panel assembly 10.

Heating component 154 and heating component 156 are supported by a frame 159, which straddles conveyor belt 152a and panel assemblies 10. Frame 159 includes spaced apart column members 160 which are interconnected by upper and lower transverse members 162a and 162b and upper and lower lateral members 164a and 164b. It should be understood that frame members 160, 162a, 162b, 164a, and 164b may comprise conventional structural members, for example tube steel, angle members, or channel members. Frame 159 further includes movable upper support members 166a and 166b and movable lower support members 168a and 168b which respectively support heating component 154 and heating component 156 on frame 159. Each upper support member 166a and 166b preferably includes an elongate member 170a having a pair of threaded collars 172a and 172b at ends 171a and 171b, which are supported on and engage threaded shafts 176a, 176b, 176c, and 176d which are supported on frame 159. Each lower support member 168a, 168b similarly includes an elongate member 170b having threaded collars 174a and 174b at respective ends 173a, and 173b, which are supported on and engage threaded shafts 176a, 176b, 176c, and 176d. Shafts 176a, 176b, 176c, and 176d are supported by and extend between respective upper mounting brackets 178a, 178b, 178c, and 178d and lower mounting brackets 179a, 179b, 179c, and 179d, which in turn are respectively supported on upper and lower transverse members 162a and 162b. Threaded shafts 176a, 176b, 176c, and 176d are driven by a gear box and motor assembly 180, which is supported by frame 159 and coupled to respective sprocket gears 182a, 182b, 182c, and 182d, which are mounted to the upper ends of threaded shafts 176a, 176b, 176c, and 176d, by drive chains 184.

Each shaft 176a, 176b, 176c, and 176d preferably includes a first or upper portion and a second or lower portion which are threaded in opposite directions, so that when shafts 176a, 176b, 176c, and 176d are rotated and driven by gear box and motor assembly 180, upper support members 166a and 166b will move generally simultaneously in an opposite direction from lower supports 168a and 168b to move heating components 154 and 156 either toward panel assembly 10 to their respective heating positions or away from panel assembly 10 to their respective holding positions. Alternately, upper collar members 172a and 172b may be threaded in opposite directions from lower collar members 174a and 174b to achieve the same result.

Similar to the first embodiment, heating component 154 preferably includes a shortwave infrared radiation source, for example a plurality of shortwave infrared emitting lamps 158. Reference is made to lamps 58 of heating component 54 described in reference to heater 50 for further details of lamps 158. Lamps 158 are supported in a housing 185, which includes mounting flanges 186 for coupling heater housing 185 to upper movable supports 166a and 166b (FIG. 5) so that heating component 154 can be moved up and down shafts 176a, 176b, 176c, and 176d. Flanges 186 are preferably releasably secured to supports 166a and 166b by conventional fasteners, such as bolts or clamps so that heating component 154 may be removed for service or substitution.

Heating component 156 preferably includes a source of longwave infrared radiation, such as a quartz emitter similar to heater 56 of the first embodiment, which is supported in a housing 188. Similar to housing 185, housing 188 includes mounting flanges 190, which are coupled to movable supports 168a and 168b, for example by releasable fasteners, to permit repositioning of heater 156 from its holding position to its heating position. Since quartz emitters have a relatively long heat-up time, it is preferred to leave the longwave infrared radiators energized during the assembly process. In order to control the application of heat, therefore, heating components 154 and 156 are moved in relatively close proximity to panel assembly to heat panel assembly 10' and moved away from panel assembly 10' to essentially discontinue application of heat. In addition, the proximities of heating components 154 and 156 to panel 10' may be adjusted to control the heating process should the variations in the panel assembly affect the rate of heating. It should be understood, however, that lamps 158 (and lamps 58) have essentially no heat-up time and, therefore, lamps 158 (and 58) may be de-energized for conservation of energy. Optionally, heating component 154 may be supported in a fixed position. But, in order to accommodate varying dimensions between panel assemblies 10' it is preferred to provide frame 159 with upper and lower movable supports to permit repositioning of both heating components 154, 156 and which would additionally permit the positions of heating components 154 and 156 to be reversed if desired.

As best seen in FIG. 5, heater 150 also includes a heat localizer 195 which is interposed between first heating component 154 and panel assembly 10'. Heat localizer 195 is substantially similar to heat localizer 76 as described above. Alternatively, heat localizer 195 may be similar to heat localizer 76'. In this manner, the infrared radiation from lamps 158 is localized on the glass side of the adhesive or adhesive-free side of panel assembly 10 and is directed away from heat sensitive components, as described in reference to the first embodiment. In a similar manner to heat localizer 76, heat localizer 195 may be supported by heating component 154 or optionally supported by frame 159.

Figure 7:
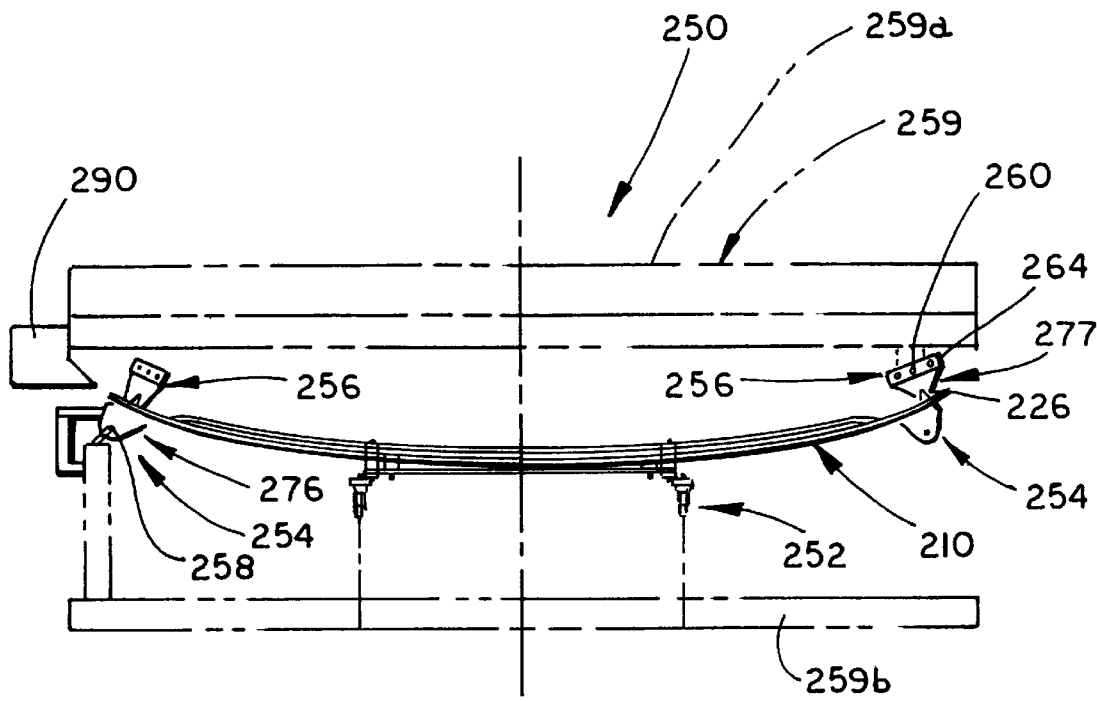
FIG. 7 is an end elevation view of a third preferred embodiment of a heater assembly of the present invention positioned along a conveyor which transport panel assemblies to be heated.
Figure 8:
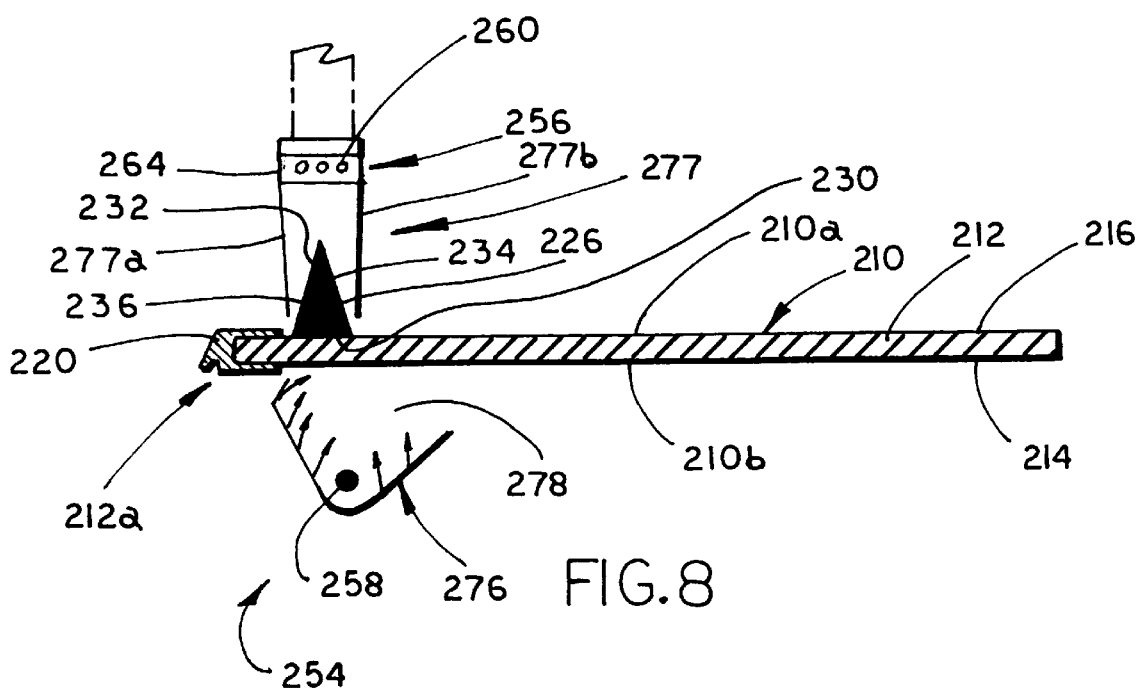
FIG. 8 is an enlarged section view of a peripheral portion of one of the panel assemblies to be heated by the heater assembly of FIG. 7.
Figure 9:
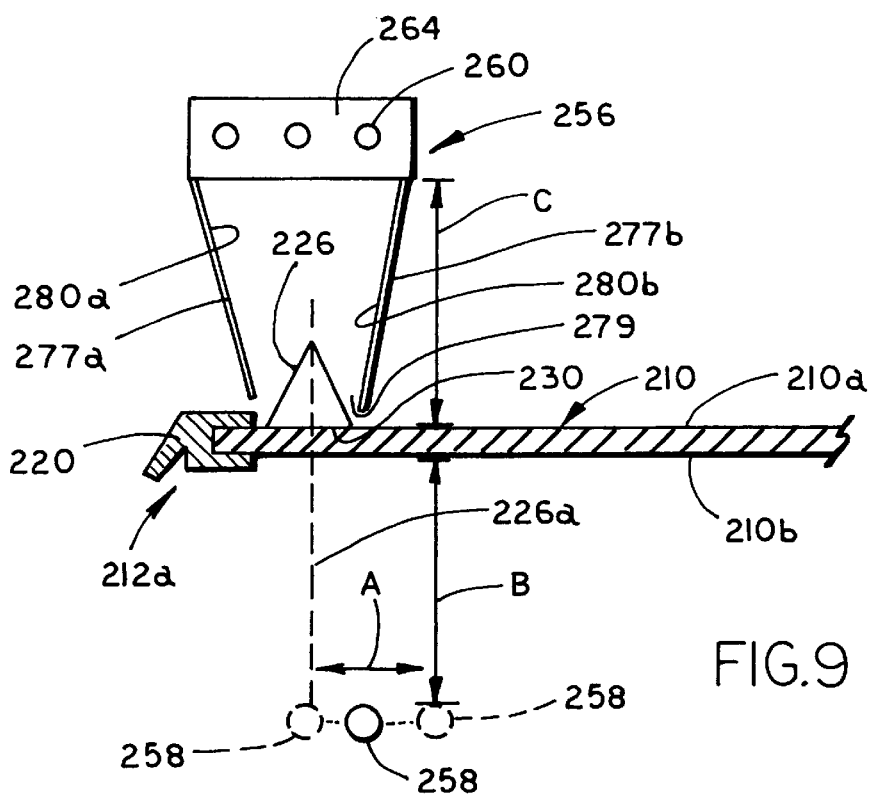
FIG. 9 is an enlarged cross-section view similar to FIG. 8 illustrating the positions of a shortwave infrared emitting lamp of the heater assembly of FIG. 7.

Referring to FIGS. 7–9 a third preferred embodiment 250 of a heater assembly of the present invention is illustrated. Heater assembly 250 includes a first or lower heater component 254 and a second or upper heater component 256, which are respectively positioned below and above a panel assembly 210 and supported on frame 259. Frame 259 includes upper and lower frame members 259a and 259b which respectively support upper and lower heater components 256 and 254. Heater components 254, 256 are preferably adapted to move from a holding or non-heating position to a heating position in a similar manner to the previous embodiments; therefore, reference is made to the previous embodiments for further details of frame 259. Panel assembly 210 is preferably supported on conveyor 252 in a similar manner to the previous embodiments. Therefore, reference is made to conveyor 152 for the general details of the conveyor and how the conveyor supports panel 210.

Referring to FIG. 8, panel assembly 210 includes a substrate or panel 212, preferably a glass panel, an optional molded member 220, such as a gasket, and a bead 226 of heat activated adhesive. Substrate 212 includes first and second opposed sides 214 and 216 which respectively define adhesive sides and non-adhesive sides 210a and 210b of panel assembly 210. Bead 226 is formed, by for example extrusion, on adhesive side 210a of panel assembly 210 and preferably on a peripheral portion 212a of substrate 212 adjacent molded member 220. It should be understood that panel assembly 210 may not include a molded member. In the illustrated embodiment, however, panel assembly 210 includes molded member 220 which comprises a three-sided gasket. It should also be understood by those skilled in the art that molded member 220 may comprise other molded members, including for example a single-sided seal or gasket, a two-sided gasket, or the like. Bead 226 includes an interface surface or portion 230, a core portion 236, and outer skin surfaces 232 and 234 in a similar manner to bead 26 of the previous embodiments. Interface portion 230 directly contacts adhesive side 210a of panel assembly 210 and provides a surface through which heat is transmitted to bead 226 from substrate 212 as will be more fully described below. In addition, outer skin surfaces 232 and 234 converge to form a tip and provide a surface through which heat is transmitted to core portion 236, as will be more fully described below.

Figure 12:
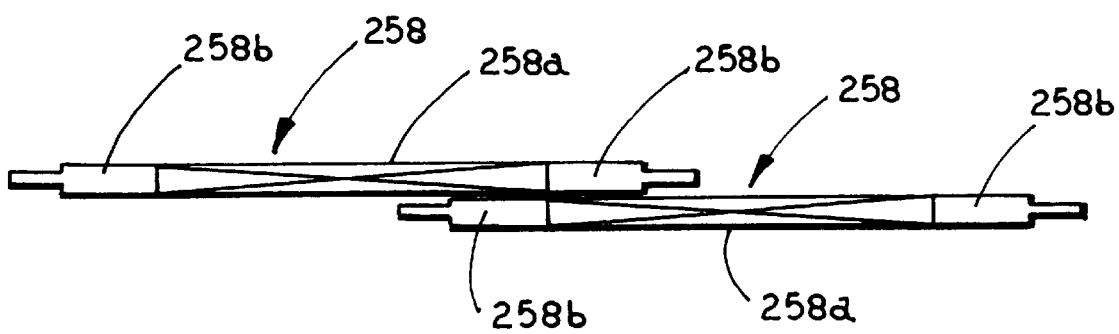
FIG. 12 is a plan view of shortwave heat emitting lamps of the heater assembly of FIG. 7.

Heater component 254 is supported by lower frame member 259b and preferably includes one or more shortwave infrared radiation sources, for example one or more shortwave infrared emitting lamps 258. Referring to FIG. 12, heating component 254 preferably comprises a plurality of relatively short elongate shortwave infrared emitting lamps 258 which are arranged with overlapping ends so that they can be adjusted to accommodate varying sizes of panel assemblies. In addition, by providing a plurality of overlapping lamps, lamps 258 can be arranged in a circular pattern and/or to follow the contours of the glass panel assembly. As best seen in FIG. 12, each emitting lamp 258 includes a heat emitting zone 258a and a non-heat emitting zone 258b. Preferably lamps 258 are arranged to provide a uniform heat profile to panel by overlapping non-heat emitting zones 258b and aligning heat emitting zones 258a to provide a generally continuous and linear source of heat from lamps 258.

Heating component 256 also supported on frame 259 by upper frame member 259a, on the other hand, preferably includes a longwave infrared radiation source. As shown in the illustrated embodiment in FIGS. 8 and 9, heating component 256 may comprise a plurality of quartz emitters 260 which are embedded in a fused quartz medium substrate 264 in a similar manner to heating component 56. Furthermore, heating component 256 preferably heats with a thermal mass temperature in a range of about 450° F. to 900° F. More preferably, second heating component 256 produces or heats with a thermal mass temperature in a range of about 500° F. to 750° F. Most preferably, second heating component 256 produces or heats with a thermal mass temperature in a range of about 650° F. to 700° F. In addition, as described in reference to the previous embodiments, second heater component 256 preferably comprises a perimeter heater which directs heat to perimeter 212*a* of substrate 212 and, more specifically, directs heat directly onto the adhesive bead 226 which is on adhesive side 210*a*.

Figure 11:
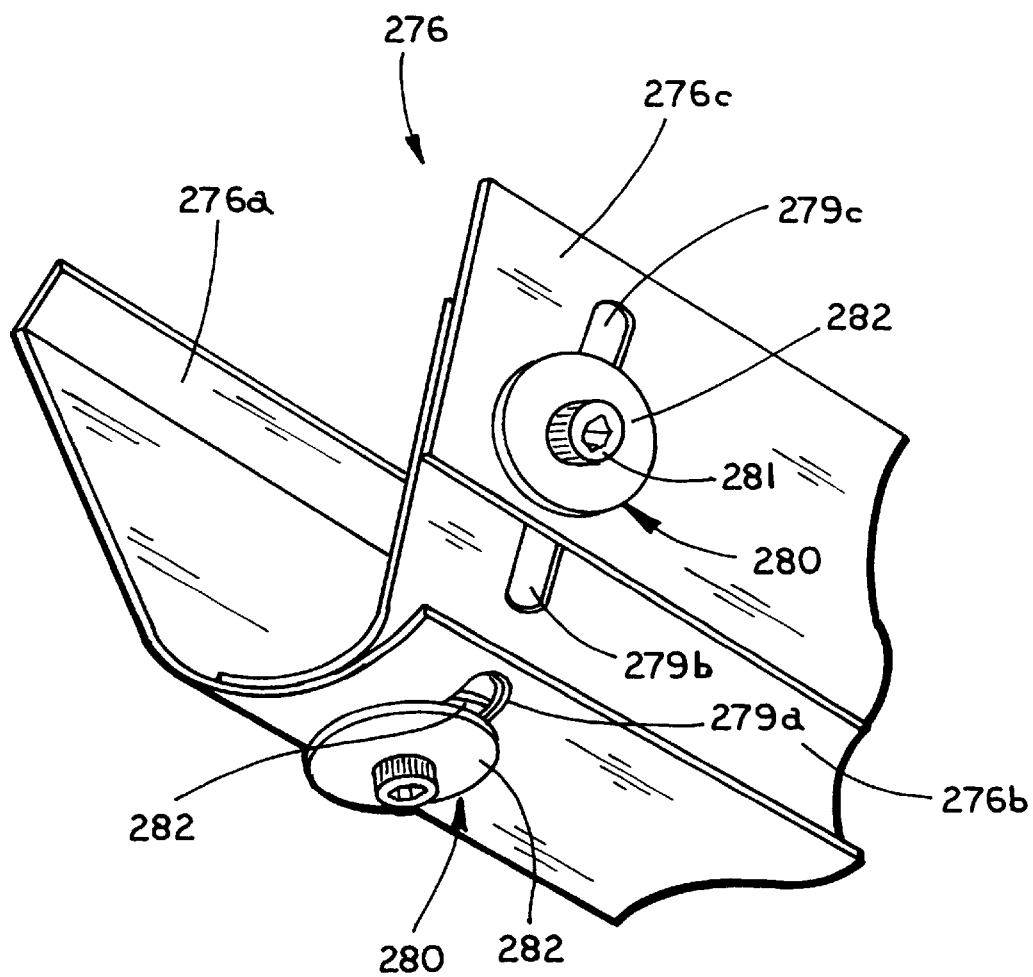
FIG. 11 is a partial fragmentary perspective of a heat localizer or shield of the heater assembly of FIG. 7.

Referring again to FIG. 8, first heating component 254 optionally includes a heat directer or localizer 276 which directs the heat from lamps 258 onto a portion of substrate 212 which is generally aligned with bead 226. Further, heat localizer 276 shields the central portion of the panel assembly 210 and molded member 220 from the heat which is emitted from heating component 254. In this embodiment, as shown in FIG. 11, heat localizer 276 comprises a shield which is preferably formed from a plurality of slidably interconnected shield members 276*a*, 276*b*, and 276*c* which define a perimeter or heater opening 278 between members 276*a* and 276*c*. Heater opening 278 generally corresponds to perimeter portion 212*a* of substrate 212 adjacent molded member 220 and corresponds to and generally aligns with adhesive bead 226. It should be understood that when adhesive bead 226 does not follow the perimeter of substrate 212, however, heater opening 278 will not follow the perimeter of the substrate and, instead, will follow bead 226. As best seen in FIG. 11, each shield member 276*a*, 276*b*, and 276*c* includes an elongate opening 279*a*, 279*b*, or 279*c*, respectively, which receives an adjustable fastener and washer assembly 280. Fastener and washer assemblies 280 permit adjustment of the respective shield members 276*a*, 276*b*, and 276*c*. In the illustrated embodiment, each releasable fastener and washer assembly 280 comprises a threaded fastener 281 and a pair of enlarged washers 282 which are positioned on opposed sides of the respective overlapping shield members to provide bearing surfaces for fastener 281 and, further, to frictionally hold the respective shield members 276*a*, 276*b*, and 276*c* in position when fasteners 280 are tightened. As will be understood by those skilled in the art, when fasteners 281 are loosened, shield members 276*a*, 276*b*, and 276*c* may be adjusted to permit lengthening and shortening of one side of shield 276 and rotation of shield member 276*a* about the interconnection between shield member 276*a* and shield member 276*b*. In this manner, shield 276 can be adjusted to suit the configuration of panel assembly 210 and bead 226 as needed in order to direct heat onto that portion of substrate 212 which will effectively heat bead 226 and to shield the central portion of substrate 212 and molded member 220 from excessive heat.

Referring to FIG. 9, lamp or lamps 258 of heating component 254 are preferably aligned with central axis 226*a*. However, each lamp 58 may be offset from the central axis 226*a* of adhesive bead 226 by a distance A. Distance A is preferably less than 24 inches, more preferably less than 12 inches, and most preferably one inch or less. Furthermore, preferably lamp 258 is preferably spaced at a distance B of less than 24 inches from non-adhesive side 210*b* of panel assembly 210, more preferably, less than 12 inches from non-adhesive side 210*b*, and most preferably, less than 3 inches away from the non-adhesive side of panel assembly 210.

In the illustrated embodiment, heater component 256 also optionally includes a heat directer or heat localizer 277 which includes reflective walls 277*a* and 277*b* which direct or localize the heat emitted from heating component 256 on outer skin surfaces 232 and 234 of bead 226. As best seen in FIG. 8, reflective sides 277*a* and 277*b* may be extended closely adjacent to adhesive side 210*a* of panel assembly 210 and, further, preferably straddle adhesive bead 226. In this manner, molded member 220 and the central portion of substrate 212 are shielded or masked from the heat which is emitted from second heating component 256.

In a similar manner to first heater component 254, second heater component 256 is spaced at a distance C from adhesive side 210*a* of panel assembly, with distance C being preferably less than 24 inches, more preferably less than 12 inches, and most preferably less than 3 inches from adhesive side 210*a*. In addition, second heater component 256 is preferably aligned with central axis 226*a* of bead 223 but may be offset preferably less than 24 inches, more preferably less than 12 inches, and most preferably less than 1 inch from central axis 226*a*.

Heat localizer 277 also includes a perimeter opening 279 defined between reflective sides 277*a* and 277*b* for directing heat from heater component 256 onto outer skin surfaces 232 and 234 of bead 226. In this manner, the heat from heating component 256 is localized on bead 226 and the heat sensitive components, such as molded member 220, which tend to degrade under high temperatures such as those associated with activation of adhesive bead 226, are shielded from the radiation emitted from heating component 256. Furthermore, heat localizer 277 shields or masks the remaining portion of panel assembly 210 to avoid introduction of cracks and delamination. As noted in reference to the earlier embodiments, by shielding or masking the central portion of the panel, panel assembly 210 is easier to handle.

Optionally, heat localizer sides 277*a* and 277*b* include reflective surfaces 280*a* and 280*b*, respectively. For example, sides 277*a* and 277*b* may comprise polished sheet metal members backed with an insulating substrate as described in reference to the earlier embodiment of heat shield 76. For further details of heat shield 277, reference is made to heat shield 76.

Figure 10:
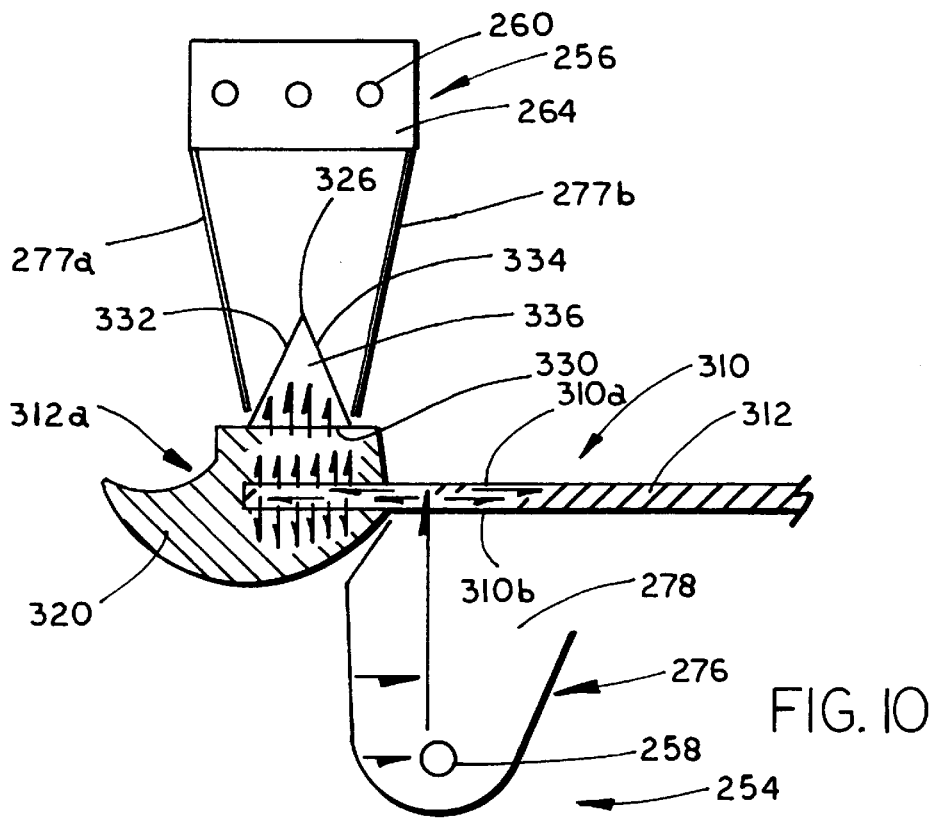
FIG. 10 is an enlarged cross-section view similar to FIG. 9 illustrating a second embodiment of the panel assembly to be heated by the heater assembly of FIG. 7.

Referring to FIG. 10, another embodiment 310 of a glass panel assembly is shown. In this embodiment, panel assembly 310 includes a glass panel substrate 312 with a three-sided gasket 320 formed on its peripheral portion 312*a* and an adhesive bead 326 formed on gasket 320. Bead 326 is applied to a portion 320*a* of gasket 320 such that its interface surface or portion 330 contacts gasket 320. Similar to the previous embodiment, panel 310 is heated by first heater component 254 and second heating component 256. In this application, however, heater component 254 is preferably aligned and positioned over a portion of panel 312 adjacent gasket 320 but offset from bead 326. Similarly, heater component 254 preferably includes heat localizer or heat shield 276 which directs heat away from gasket 320 and instead localizes the heat on the portion of substrate 312 adjacent gasket 320 and offset from bead 326. In this application, glass panel 312 transmits heat to gasket 320 which transmits heat to adhesive bead 326 through interface surface 330. Consequently, both panel 312 and molded member 320 act as black body radiators for heating adhesive 326. On the other hand, heater component 256 is preferably aligned over adhesive bead 326 to direct heat on outer skin surfaces 332 and 334 of adhesive bead 326 in a similar manner to the previous embodiments. Again, lamps 258 are preferably spaced less than 24 inches from the non-adhesive side 310b of panel assembly 310, more preferably, less than 12 inches from non-adhesive side 310b, and most preferably, less than 3 inches from non-adhesive side 310b. Heater component 256 is preferably spaced from substrate 312 less than 24 inches from the adhesive side 310a of panel assembly 310, more preferably, less than 12 inches from adhesive side 310a, and most preferably, less than 3 inches from adhesive side 310a. Most preferably, heater component 256 is spaced approximately two inches from adhesive side 310a.

In the preferred form of the invention, heating assembly 250 includes a cooling apparatus 290 to cool substrate 212 or 312 after the panel assembly 210 has been removed from heating assembly 250 so that panel assembly 210 or 310 can be handled manually without injuring the worker. Cooling apparatus 290 may be supported by frame 259 or may be located adjacent the conveyor downstream from heater assembly 250. Preferably, when handling glass panel assembly 210 or 310, the substrate should be sufficiently cooled to permit manual handling by workers. At the same time, the cooling of the substrate must be balanced with the heating of the bead and substrate such that the cooling does not hamper the core of the bead reaching its activation temperature. Preferably, panel assembly 210 or 310 is cooled such that the region non-adjacent the bead is cooled while leaving the bead region at its elevated temperature. Without active cooling, it has been found that the temperature in one panel assembly sample having substrate dimensions of 60"×24" and bead dimensions of 8 mm×14 mm does not drop below 120° F. until approximately nine minutes after the heating stage is complete and eight and a half minutes after the core reaches the heat activation temperature. Preferably, the handling portion of the substrate 212 or 312 is cooled to a temperature below a preferential temperature as quickly as possible and, preferably, within fifteen minutes, more preferably, within nine minutes, and most preferably less than two minutes after the last heating stage is complete or the bead has reached its heat activation temperature.

Referring to FIG. 7, cooling apparatus 290 directs a gaseous stream, for example air or an inert gas, such as argon or nitrogen or the like, onto a portion of the glass panel in order to cool substrate 212 or 312 to the desired temperature within the desired time frame. Preferably, cooling apparatus 290 directs the gaseous stream on to the peripheral portion of the glass panel. Cooling apparatus 290 preferably comprises a blower, such as a turbo fan or an air knife blower, for example an air knife blower commercially available from EXAIR® Corporation of Cincinnati, Ohio. In addition, the blower preferably directs the gaseous stream onto the peripheral portion of the substrate at an angle in a range of about 0° to 85° from central axis 226a of bead 226 and, more preferably, in range of about 40° to 60° from the central axis 226a, and most preferably at an angle of about 45° from central axis 226a. In order to assure that bead 226 (or 326) achieves its activation temperature, however, the cooling must be matched or balanced with the heat from heater components 254 and 256.

Cooling apparatus 290 preferably applies a sufficient gaseous stream to cool the peripheral portion of substrate 212 or 312 so that panel assembly can be handled while in a manner not to interfere with the heating of bead. Referring to the example illustrated in FIG. 13, after completing the last heating state and the glass is held at ambient temperature at 400, the glass temperature gradually degrades from its peak temperature at 401 as shown on curve 402. The temperature of the glass temperature does not reach 120° F. at 403 until approximately nine and a half minutes after the heating stage is complete. In contrast, when the glass substrate is subjected to cooling by a fan, for example a turbo fan, the glass temperature drops from its peak temperature at 401 at a faster rate as shown on curve 404 to reach 120° at 405 within approximately two minutes. If the substrate is cooled by an air knife blower, the glass substrate degrades from its peak temperature at 401 at an even faster rate as shown on curve 406 and will reach 120° at 408 within approximately one and a half minutes. The preferred maximum temperature or preferential temperature for the substrate is 250° F., with a more preferred maximum temperature of 175° F., and a most preferred maximum temperature of 120° F. In order to decrease the processing time, it is desirable to reduce the temperature of the handling portion of the glass substrate to below the desired maximum within 15 minutes or less, more preferably within 9 minutes or less, and most preferably within 2 minutes or less.

Figure 14:
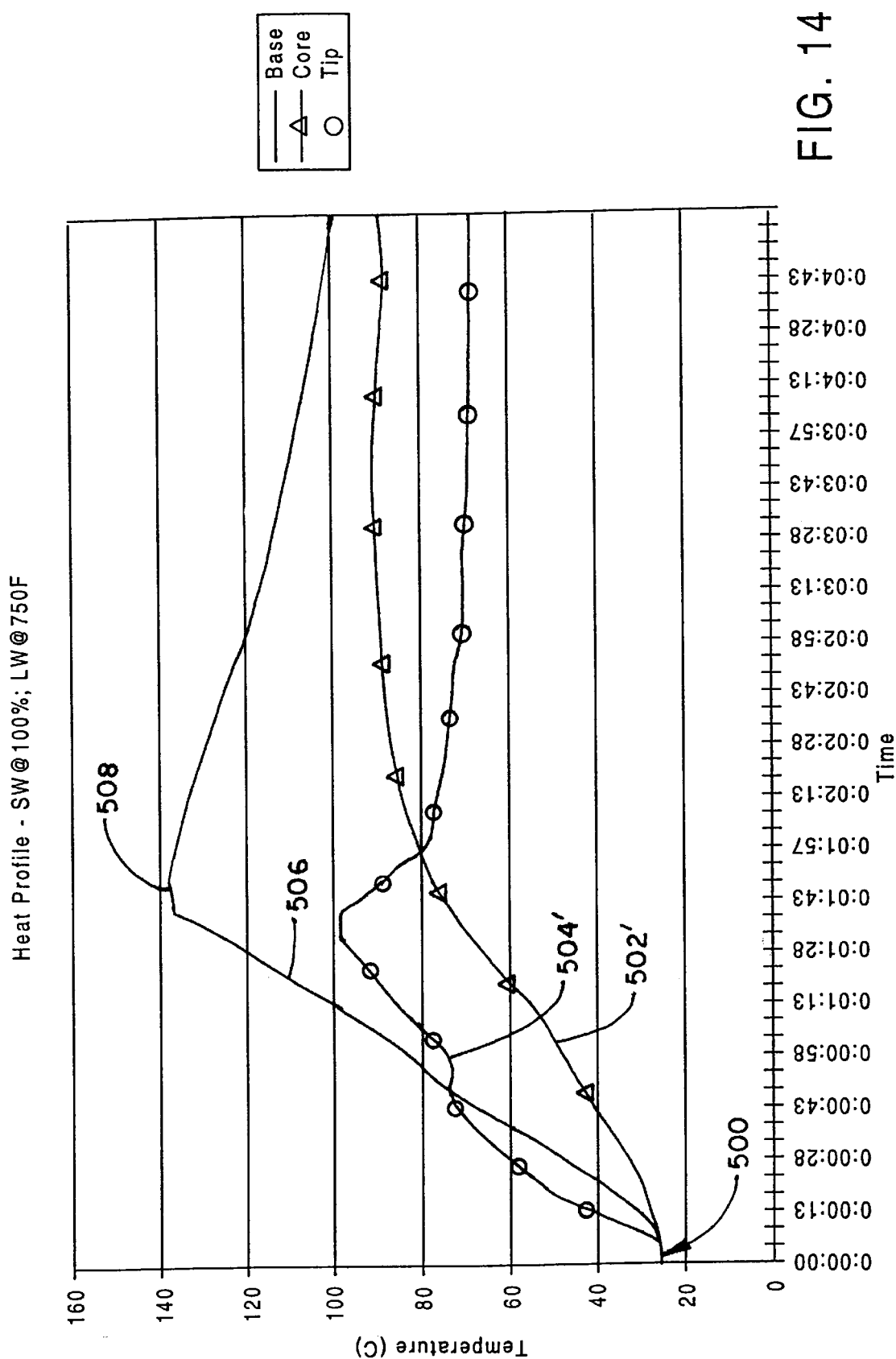
FIG. 14 is a graph of the temperature profile of a bead of heat activated adhesive of the panel assembly during heating.

Referring to FIG. 14, the temperature profile of the respective portions of the bead, specifically the tip (as defined between the outer skin surfaces), the core portion, and the interface portion or base of one sample assembly panel, are illustrated by curves 502, 504, and 506, respectively. The heat is applied at 500 with the interface portion reaching its maximum temperature at 508 of approximately 135° C. within approximately one and a half minutes of initiating the heating. In contrast, the temperature of the tip portion of the bead reaches a maximum temperature of approximately 95° C. at about the same time as the interface portion reaches its maximum. The core portion, however, exhibits a slower temperature increase and reaches a preferred activation temperature of 80° C. at approximately two minutes. It can be seen from FIG. 14, that even after the heat is removed at 508, the core portion of the bead increases its temperature to a peak temperature of approximately 85° C. from which it degrades slowly as compared to the glass as shown on curve 504 of FIG. 14. In effect, the glass substrate acts as a heat sink and stores heat for a discrete period of time to continue heating the bead. Further, the geometry and composition of substrate 212 may affect the heating process. In some applications cooling may commence right after the heating stage is complete. In other applications, cooling may be initiated right after the bead has reached its heat activation temperature. In yet others, cooling may be initiated even during the heating process and even before the bead has reached its activation temperature. For example, when the cooling apparatus is supported by the heating apparatus, the cooling process may initiated during or after the heating process. Further, since heating components 254 and 256 may be energized simultaneously or individually energized and de-energized for selected periods of time, it should be understood that other sequences may be realized.

Figure 13:
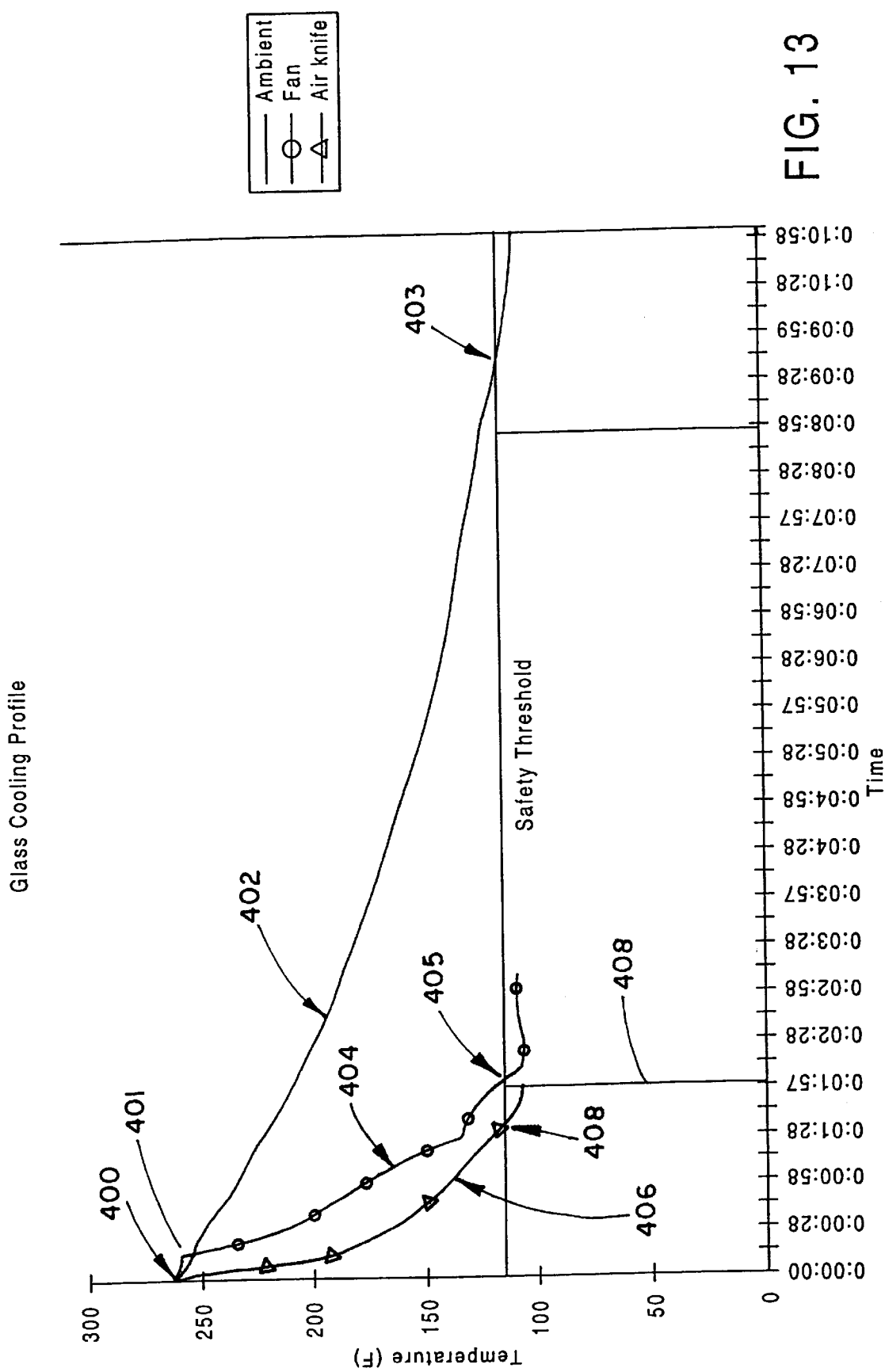
FIG. 13 is a graph of the cooling profiles of a glass panel heated by the heater assemblies of the present invention illustrating the effect of cooling the peripheral portion of the panel assembly after heating.
Figure 15:
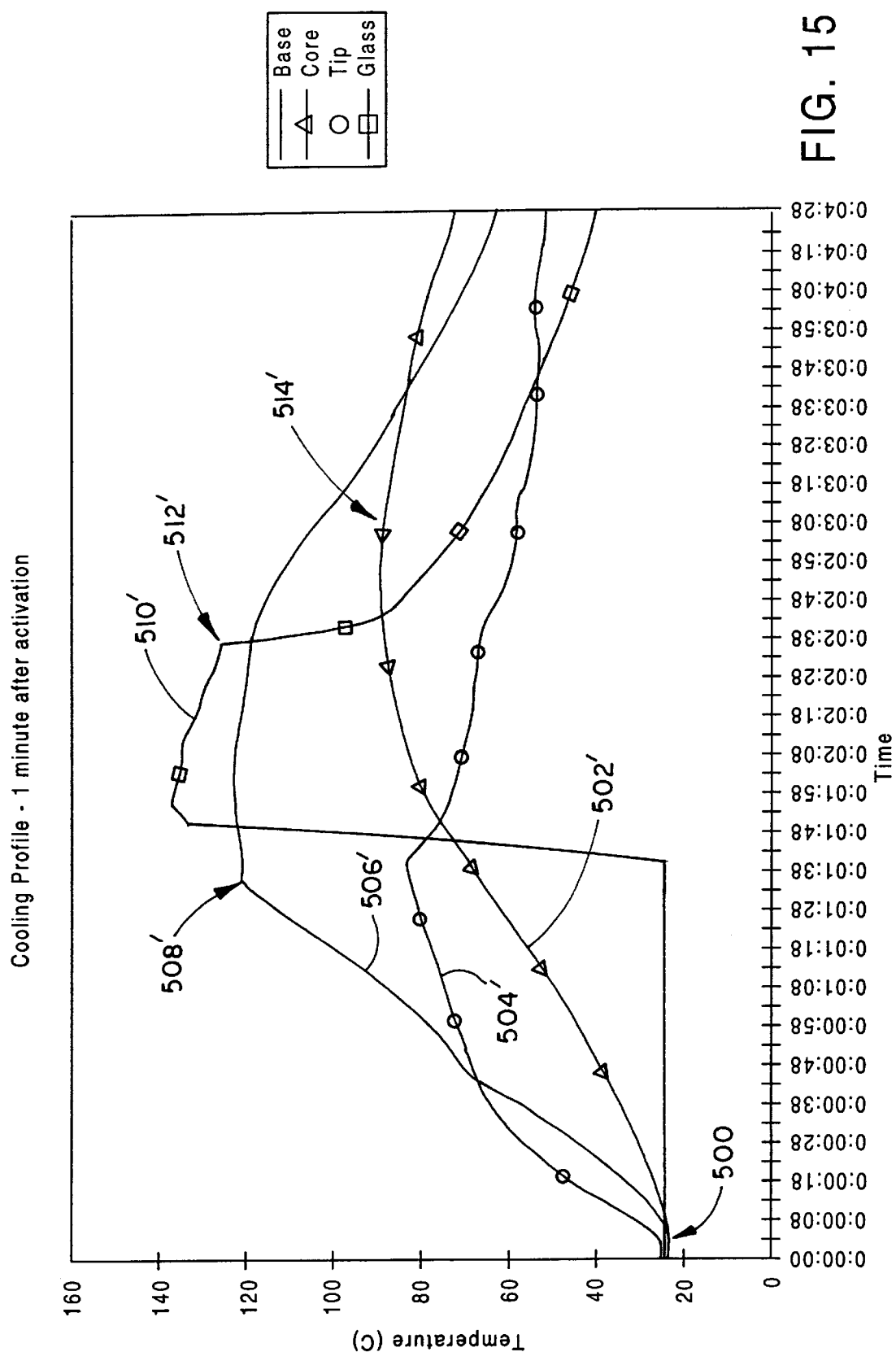
FIG. 15 is a graph of a temperature profile of the various components of the panel assembly during heating and during cooling.

Referring to the cooling profile of FIG. 15, the cooling profile includes the initial heat profiles of the outer skin surface or tip, core portion, and the interface portion as represented by the initial portions of curves 502', 504, and 506'. In addition, the cooling profile includes the temperature profile of the glass as shown by curve 510', which profile starts after the heating stage has been completed at 508'. The cooling profile reflects the temperature of the respective portions of the bead and the glass with cooling being initiated at approximately two and a half minutes after the initial heating process at 500' and approximately one minute after the heat is removed at 508'. As shown in FIG. 15, the temperature of the glass rapidly decreases to below 48° C. or 120° F. within about two minutes after the initiation of the cooling step. It should be further noted that despite the initiation of the cooling at 512', the temperature of the core continues to rise and peaks at 514' at approximately 88° C. which occurs approximately 30 seconds after the cooling is initiated at 512'. It should be understood that graphs shown in FIGS. 13–15 are for illustrated purposes only and provide one example of balancing of the heating and cooling to achieve activation of the adhesive and yet cool the substrate sufficiently to permit manual handling of the panel assembly.

In order to achieve the balance between the activation of the adhesive bead and the cooling of the glass panel for handling, the shortwave and longwave infrared radiation is preferably applied for at least 5 seconds but for less than about 10 minutes and the application of the cooling air is applied for at least 30 seconds within 5 minutes before of after the termination of the heating step or the bead reaches its activation temperature. Preferably, the substrate is cooled to its preferential temperature within 15 minutes or less, more preferably within 9 minutes or less, and most preferably within 2 minutes or less of the termination of the heating stage or the bead reaching its heat activation temperature. It should be understood that in order to accommodate the flow of the assembly line conveyor, shortwave and longwave infrared radiation heating and the cooling step may also be applied in stages in a similar manner to that described in the previous embodiment.

Figure 10A:
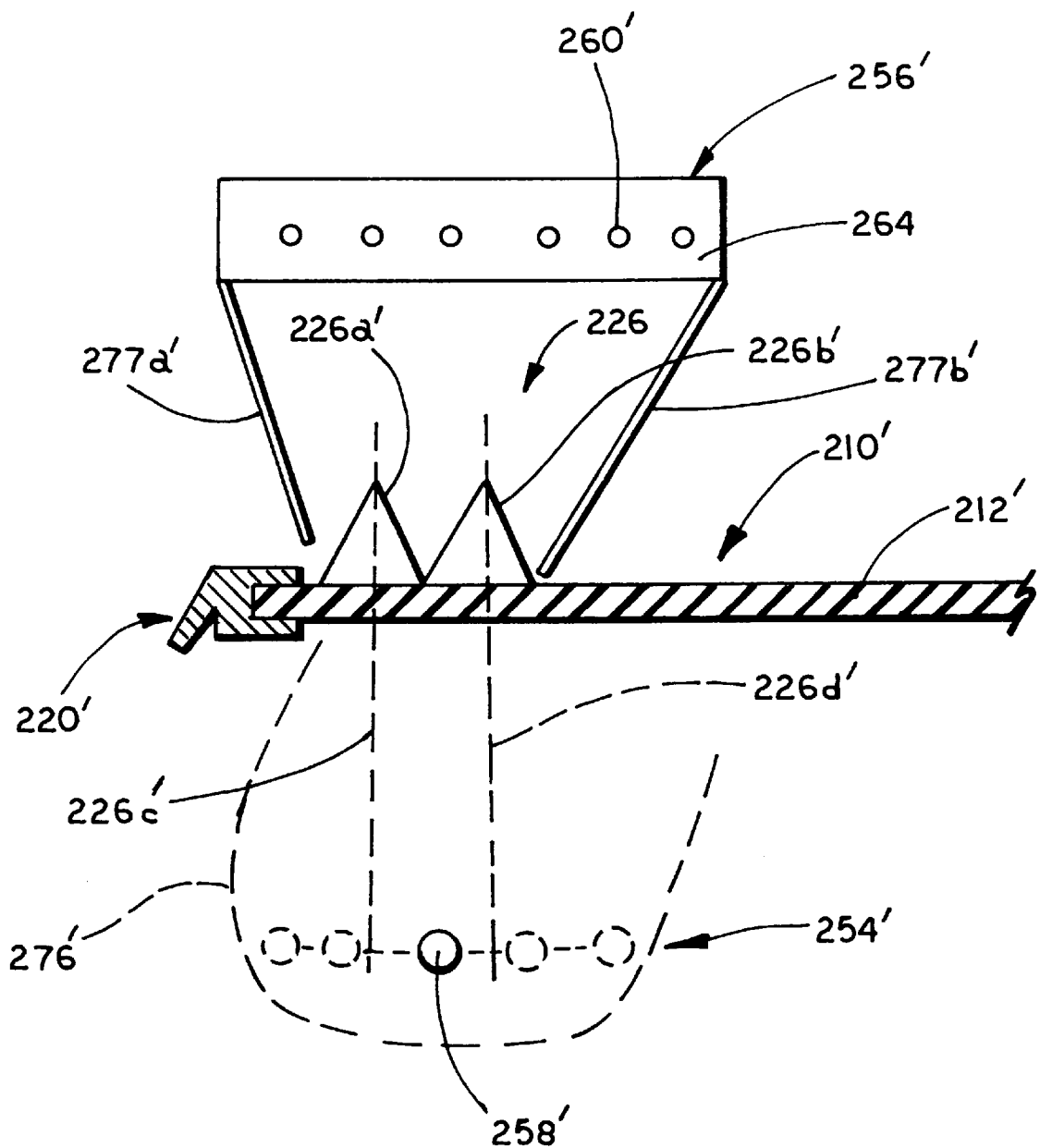
FIG. 10A is an enlarged cross-section view similar to FIG. 9 illustrating a third embodiment of the panel assembly to be heated by the heater assembly of FIG. 7.

Referring to FIG. 10A, a third embodiment of panel assembly 210 is illustrated. Panel assembly 210' includes a substrate 212', preferably a glass substrate, and an optional molded member, such as a gasket, and an adhesive 226'. In the illustrated embodiment, adhesive 226' comprises a pair of adhesive beads 226a' and 226b', each with a central axis 226c' and 226d', respectively. Beads 226a' and 226b' are applied adjacent molded member 220' and are similarly extruded or otherwise applied to an adhesive side 210a' of panel 210'. To heat beads 226a' and 226b', heater assembly 250' includes a first heater component 256' and a second heater components 254' which are respectively positioned over beads 226a' and 226b' on adhesive side 210a' and over a portion of substrate 212' aligned with the beads on non-adhesive side 210b'. Heater components 256' generates longwave infrared radiation and preferably includes quartz emitters 260' which are embedded in a fused quartz medium substrate 264', similar to heater component 256. Heater component 254' preferably generates shortwave infrared radiation and includes one or more lamps 258'. In general heater components 254' and 256' are of similar construction to heater components 256 and 254, respectively, and therefore reference is made thereto for further details.

In this embodiment, beads 226a' and 226b' are generally smaller and, therefore, reach their respective heat activation temperatures more quickly than described in reference to the previous embodiments. Consequently, the processing time is reduced. Further, as the beads require less heat or less heat input, cooling may be obviated since the glass temperature may be substantially lower than in the previous embodiments and may cool rapidly in ambient air to reach the preferential temperature quite soon after completing the heating stage of the process.

As best seen in FIG. 10A, heater component 256' is generally aligned over beads 226a' and 226b' such that heater components 256' preferably delivers the same heat profile to both beads. Similarly, heater component 254' is preferably aligned with beads 226a' and 226b' in order to provide uniform heating to both beads. However, it should be understood, that heater component 254' may optionally include a respective lamp 258' associated with each bead, in which case, the lamps would preferably be aligned with the central axes 226c' and 226d' of the respective beads 226a' and 226b'. However, as described in reference to the previous embodiments, the heater components may be offset from the respective central axes of beads 226a' and 226b' provided that the heater components' reflectors 277a' and 277b' and 276' compensate and reflect the heat from the respective heater components to provide uniform heating of beads 226a' and 226b'.

Panel assemblies 10, 10', 210, and 310 described above are manufactured according to a method which results in "ready-to-install" panel assembly. Heat activated adhesive bead 26, 226, or 326 can be applied to the panel substrate 12, 212, or 312 at a location remote from the production site, such as a "just-in-time" plant. This preassembly process eliminates a complicated step in the vehicle assembly line and removes the expense and problems of handling and precautionary measures that can be associated with the chemicals forming the adhesive and the adhesive primers. Panel assemblies 10, 10', 210, and 310 are preferably heated using shortwave and longwave infrared radiation to activate the adhesive properties of heat activated adhesive bead 26, 226, or 326. Furthermore, the adhesive properties of the bead are activated quickly. Alternatively, panel assemblies 10, 10', 210 and 310 may be heated by shortwave infrared radiation, with the shortwave infrared radiation directed onto the non-adhesive side of the panel assembly and with a black body radiator positioned on the adhesive bearing side of the panel assembly, as described earlier, which absorbs the shortwave infrared radiation and emits infrared radiation back toward the bead 26, 226, or 326. Optionally, the panel assembly may be heated on both sides with shortwave infrared radiation or longwave infrared radiation. Moreover, the adhesive free side of the panel assembly may be heated with longwave infrared radiation, while the adhesive bearing side may be heated with the shortwave infrared radiation.

Once assembled, panel assemblies 10, 10', 210, and 310 are delivered to the production site and placed on conveyor 52, 152, or 252 which then transports the panel assembly to heater 50, 150, 50', 50'', 50''', 50'''', or 250 where heat is applied to the panel assembly (10, 10', 210, or 310). Heat, preferably in the form of shortwave infrared radiation, is applied to the adhesive free side of the panel substrate (12, 212, or 312) and, preferably, localized onto that portion of the adhesive free side of panel 12, through for example a shield 76 or heat directer 76', 276, or 376 which is aligned with bead 26, 226, or 326 so that the panel substrate is heated in a localized area which corresponds to bead 26, 226, or 326, by for example heat localizer 277. Bead 26 or 226 in effect draws heat from the localized heated area of panel substrate 12 through its glass interface surface or base 30. On the other hand, bead 326 draws heat from localized area of the heated panel 312 through gasket 320. Furthermore, heat, preferably in the form of longwave infrared radiation, is applied directly onto the bead side of panel assembly 10 to directly heat bead 26, 226, or 326 through its skin surfaces. Preferably, the longwave infrared radiation is similarly directed to or localized on the bead, for example by way of a shield or by arranging the longwave infrared radiation source in a perimeter heater arrangement where the individual longwave infrared radiation sources are aligned with the bead, as described in reference to heating assembly 250. As a result, bead 26, 226, or 326 is heated from two sides-its base or interface region (30, 230, or 330) and its outer skin surface region (32, 34; 232, 234; or 332, 334). By indirectly applying the shortwave infrared radiation, which provides high energy heating, and directly applying the longwave infrared radiation to the bead, adhesive bead 26, 226, or 326 is heated in a controlled fashion which achieves uniform heating of the bead and yet avoids degradation of the adhesive itself and further avoids degradation of the substrate panel and its surrounding attachments, including molded gaskets such as 20, 220, and 320. Uniform heating of the adhesive bead assures appropriate retention of panel assembly 10, 10', 210, or 310 in the vehicle.

As described previously, in order to uniformly heat the adhesive, the bead is preferably heated to an activation temperature in a range of about 50° C. to 160° C., more preferably, in a range of about 70° C. to 120° C., and, most preferably, in a range of about 80° C. to 110° C. By providing an adhesive with a minimum or suitable activation temperature, unintentional activations can be avoided. In addition, in order to reduce or eliminate surface degradation of adhesive bead 26 or 226 and/or of moldings, attachments, and structures that are attached to the panel and/or are used in forming the panel, the shortwave and longwave infrared radiation are balanced by a control system to maintain the temperature of the skin surface of bead 26, 226, or 326 to be preferably less than about 170° C., more preferably less than about 140° C. and, most preferably, less than about 120° C. The balance of the shortwave and longwave radiation is achieved through sensors 198 (FIG. 5), which may mounted to heater 50, 150, 50', 50", 50''', 50'''', or 250 to monitor the surface temperature of the adhesive bead. Sensors 198 are coupled to control assembly 200 (FIG. 5), which may provide a manual operation mode and/or may be preprogrammed to maintain the temperature of the adhesive bead to a desired temperature. Control assembly 200 is electrically coupled to gear box and motor assembly 180, which sends actuation signals to motor assembly 180 to control the position of heating components 154 or 254 and 156 or 256. Optionally, control assembly 200 may be further coupled to the individual infrared radiation sources in heating components 154 or 254 and 156 or 256 to provide an override in the event motor assembly 180 malfunctions or to provide adjustment of the levels of power delivered to the individual sources to thereby adjust the emission of heat from heating components 154 or 254 and 156 or 256.

In order to achieve the activation temperature of the adhesive bead and yet reduce the assembly time, the shortwave and longwave infrared radiation is preferably applied for at least one minute but for less than about twenty minutes, more preferably, less than about ten, and most preferably less than about five minutes. In preferred form, the shortwave and longwave infrared radiation is applied for less than about two minutes. However, in order to accommodate the flow of the assembly line conveyor, which for example may index or move a fixed distance about every 60 to about 90 seconds, the shortwave and longwave infrared radiation may be applied in stages. For example, where the total heat activation time is about 3 to about 5 minutes and the conveyor indexes about every 60 seconds, three or more stages would be required. Typically common, at least two heating stages are preferred. Most typically, four heating stages are preferred. Preferably, no more than four stages are used, although in some applications more than four stages may be desirable, with each of the heating stages aligned along the conveyor to avoid any additional handling requirements and in close proximity to the conveyor to avoid any cool down time. Optionally, a single lear or heat tunnel may be used, through which the glass is moved on the conveyor. For example, a single lear or heat tunnel which provides either continuous heating or provides discrete heating regions that are continuously operated.

Figure 16:
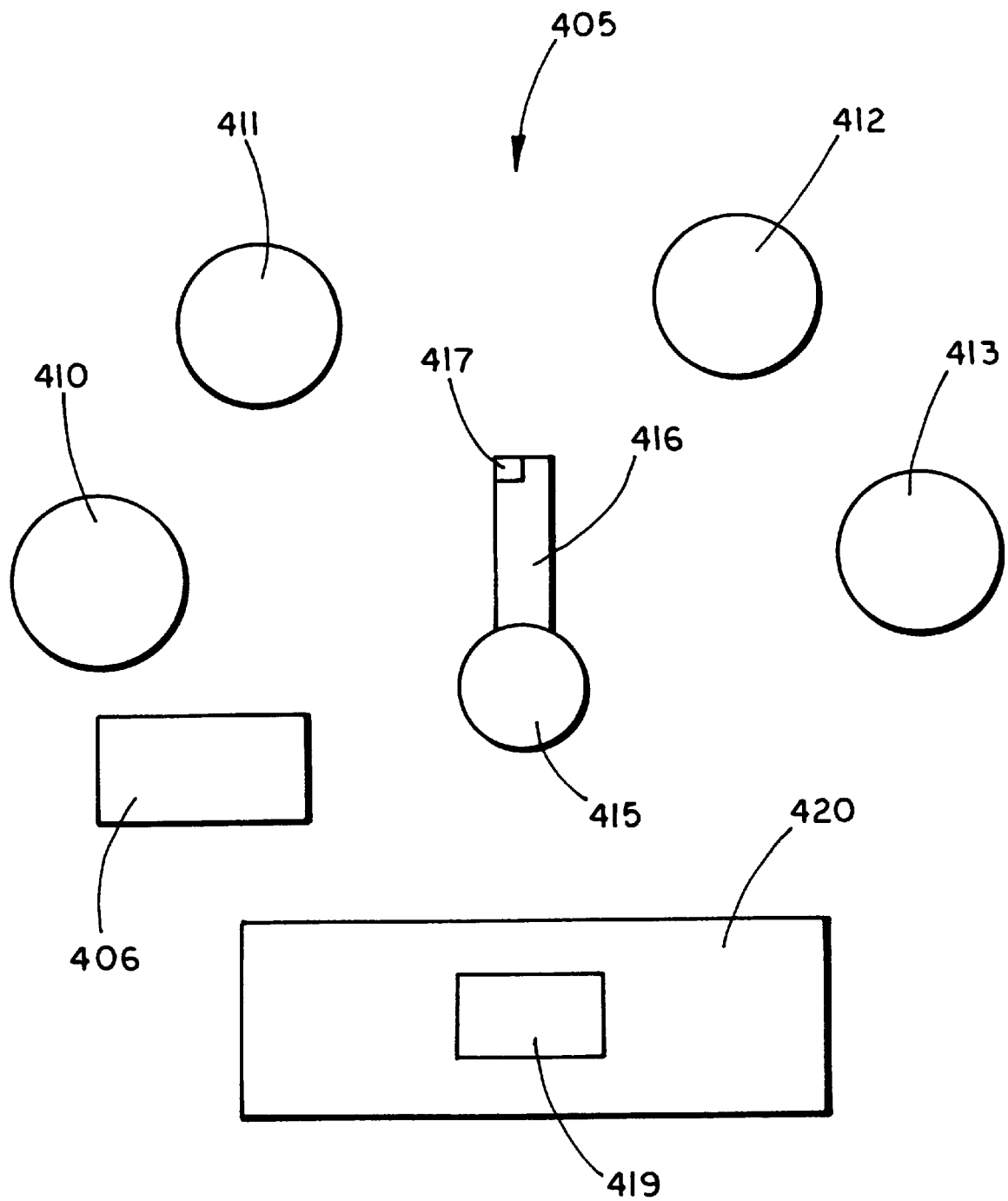
FIG. 16 is a plan view of third embodiment of a multi-stage heater assembly arrangement of the present invention.

As an alternate to a conveyorized heater comprising a plurality of heating stages arranged sequentially and with the glass substrates to be heated being loaded at a front stage and then passing through multiple heating stages to be unloaded at a rear stage (preferably with cooling provided at the unload section at the rear stage), a system comprising a set of non-sequentially arranged heating stages, such as is illustrated in FIG. 16, can be used. Embodiment 405 comprises four individual heating stages, 410, 411, 412 and 413, clustered around a robot 415 equipped with a robotic arm 416. Glass substrates, upon which a bead of ready-to-install adhesive has been dispensed about the substrate periphery at a remote site distant from vehicle assembly line 420, are staged in staging fixture 406. A one substrate onto which the adhesive has been dispensed is picked up by robotic arm 416 and placed into any vacant one of heating stages 410–413. While this one substrate is being heated in the heating stage selected, another substrate, placed previously in another heating stage is unloaded by robotic arm 416 and decked into the frame of automobile body 419 passing along vehicle assembly line 420. Once robot 415 has placed a substrate with a now activated window fixing adhesive into a vehicle body, robot 415 returns to staging area 406 to pick up another substrate, and then move this substrate to the now vacant other heating stage. In this manner, a single robot can be used to pick up substrates incoming from a remote ready-to-install adhesive application plant, place them in a discrete heating stage, and unload heated substrates for direct decking into the vehicle body. Each of discrete heating stages 410–413 can be equipped with a cooling substage, can be provided with a heat localizer as previously described, and the entire operation can operate under computer control. Although illustrated in FIG. 16 with four heating stages, a minimum of two stages is required and less than five stages is preferred. Also, manual operations can substitute for some or all of the robotic operations of embodiment 405. The non-sequential multiple heating stage system of embodiment 405 has advantages in minimizing floor space adjacent to the vehicle assembly line. Further, robotic arm 416 can optionally be equipped with a bar code reader 417, or an equivalent part identifier reader, that reads a part identifier code on each substrate in staging fixture 406, and determines whether that particular substrate is the correct substrate to sequence with a vehicle expected to soon pass along the vehicle assembly line. In this manner, the manufacturing system illustrated in FIG. 16 can be adapted to suit just-in-time, in sequence vehicle production, and it provides a measure of flexibility insofar that an out of sequence part can be temporarily held in a discrete heating stage until its intended vehicle body arrives along the vehicle assembly line. Optionally, staging fixture 406 comprises a multi-substrate containing container which is loaded, most preferably, in-sequence to coordinate with the sequence of vehicles to pass along vehicle assembly line 420, with multiple substrates at the remote ready-to-install facility. This container, which preferably is a returnable container as known in the automotive supply arts, serves as a shipping container for substrates to the vehicle assembly plant.

As described previously, the ready-to-install (RTI) heat activatable adhesive is preferably applied to the vehicle window at a ready-to-install vehicle window facility that is remote from the vehicle assembly plant. The RTI adhesive is shipped to the vehicle assembly plant in an uncured or partially cured form. Upon arrival at the vehicle assembly plant, and preferably immediately adjacent the vehicle assembly line at the location where the windows are to be installed, the RTI adhesive is activated (most preferably by thermal activation although various forms of energy activation such as by microwave radiation, induction heating, and the like can be contemplated) to a state suitable to use as a window fixing adhesive for adhering the window to the vehicle body. Although described herein as a ready-to-install adhesive, this present invention contemplates that the adhesive as disposed on the surface of the window substrate (or on a polymer gasket itself attached to the vehicle window) can have a shape and form as applied with a cross-section that is square, rectangular, triangular, hemispherical trapezoidal, quadrilateral, bimodal, or the like and optionally with a tip or apex portion that is narrower than the base that contacts the window substrate, and that it substantially retains that shape and form during shipment from the RTI adhesive remote facility to the vehicle assembly plant where activation of the RTI adhesive will occur.

It is preferable that the RTI facility operate as a just-in-time (JIT) supplier of RTI windows to the vehicle assembly plant. Most preferably, the vehicle assembly plant is supplied from the RTI window plant using just-in-time, in-sequence techniques, such as are commonly known in the automotive supply arts, and such as are commonly used such as to supply seats to vehicles. In such a process, the assembly plant contacts the RTI window facility at the moment a specific vehicle body passes a location on the assembly line (such as entering or exiting the paint shop). The vehicle maker places a specific order for a window (or window set such as a front windshield and a rear backlite) for that particular vehicle, and for those that preceded and followed that particular vehicle on the assembly line. Thus the ready-to-install window receives orders from the vehicle assembly plant for just-in-time delivery and, preferably, in-sequence delivery. The time window for fabrication of the RTI windows at the RTI window plant and/or their delivery to the vehicle assembly plant is at least about two hours, more preferably is at least about three hours, and most preferably is at least about four hours, and is less than about forty eight hours, more preferably is less than about twenty four hours and most preferably is less than about twelve hours. For example, a preferred time window for JIT/in-sequence supply is between three to nine hours after an order is received at the RTI window plant. Within this time window, the RTI window facility fabricates and/or ships a RTI window, or set of windows, for JIT receipt at the vehicle assembly line, and more preferably, for installation , in-sequence, at the vehicle assembly line. In this regard and in order to allow sufficient RTI window fabrication and/or shipping time for JIT/in-sequence supply to the vehicle assembly plant, it is preferable that the RTI window plant be located remote from, but close to, the vehicle assembly line (less than about 60 miles distance desired, less than about 30 miles more desirable, and less than about 15 miles most desirable). Most preferably, the RTI window production line would be located at or within the vehicle assembly plant itself, whereupon, the time window for RTI window fabrication and supply to the assembly line can be less than about two hours. Alternately, the RTI window production line could be located at a vehicle window fabrication facility such as within a glass vehicle window fabrication plant.

At the RTI window plant the RTI adhesive can be disposed onto the window substrate (such as about the perimeter of a glass windshield) by a variety of means. For example, it can be dispensed from a robotic arm mounted dispenser head. Preferably, the dispenser head is capable of providing a variable profile adhesive bead. Alternately, the RTI adhesive can be dispensed into a mold separate from the panel, with the mold locating the panel on the adhesive. With the RTI adhesive in the mold, the panel is located on the adhesive and these are forced together so that the RTI adhesive bead is transferred from its mold to the window panel, whereupon the panel, with RTI adhesive applied thereto, is shipped to the vehicle assembly plant, such as is described in U.S. Pat. No. 5,331,784 entitled VEHICULAR PANEL ASSEMBLY AND METHOD FOR MAKING SAME assigned to Donnelly Corporation of Holland, Mich., which is incorporated herein by reference in its entirety.

Accordingly, the invention provides a heater assembly and method useful in installing panel assemblies, including modular window assemblies, with a heat activated adhesive that permits quick installation without the manufacturing, handling, storage, and cleaning problems associated with the moisture cure adhesives used heretofore. The invention allows a panel assembly to be preassembled with the adhesive pre-applied and yet not activated until the panel assembly is ready to install. Further, the invention provides for a method of coding the heated panel without interfering with the heat activation of the bead of adhesive.

For the purposes of the following description, the terms "upper," "lower," "vertical," and derivatives or equivalents thereof shall relate to the invention as oriented in FIGS. 1 to 12. It is understood that the invention may assume various alternative orientations, except where expressly specified to the contrary. For example, where panel assembly 10 or 10' is inverted, first and second heating components 54, 56, 154, and 156 may be reversed so that first heating components 54, 154 is positioned below panel assembly 10, 10' and second heater assembly 56, 156 is positioned above panel assembly 10, 10'. Furthermore, the number of heaters or stage heaters may be varied depending on the conveyor speed. Moreover, heaters 50, 150, and 250 may assume different arrangements for supporting the infrared radiation sources. It is also understood that the specific devices and methods illustrated in the attached drawings, and described in the following specification, are simply exemplary embodiments of the inventive concepts defined in the appended claims. Further, while some forms of the invention have been shown and described, other forms will now be apparent to those skilled in the art. Therefore, it will be understood that the embodiment shown in the drawing and described above are merely for illustrative purposes, are not intended to limit the scope of the invention which is defined by the claims which follow at the end of the description.

We claim:

1. A method of preparing a vehicle panel assembly for attaching the panel assembly to a vehicle, the vehicle panel assembly having a substrate and a bead of ready-to-install heat activated adhesive, the substrate having first and second sides and a peripheral portion, the bead being applied to the second side of the substrate and including a central core portion, an outer skin portion, and an interface portion on the second side of the substrate, said method comprising the steps of:

heating the first side of the substrate whereby the substrate heats the interface portion of the bead to heat the central core portion of the bead;

heating the outer skin portion of the bead thereby heating the central core portion of the bead and activating the ready-to-install heat activated adhesive; and cooling the substrate after heating to permit manual handling of the panel assembly after the adhesive is heat activated.

2. The method of preparing a vehicle panel assembly according to claim 1, wherein cooling includes directing a gaseous stream to the peripheral portion of the substrate to cool the substrate to permit handling of the vehicle panel assembly.

3. The method of preparing a vehicle panel assembly according to claim 2, wherein directing includes blowing one of air and an inert gas onto the peripheral portion of the substrate to thereby cool the substrate.

4. The method of preparing a vehicle panel assembly according to claim 3, wherein blowing includes blowing said one of air and an inert gas onto the peripheral portion at an angle in a range of approximately 0° to 85° from a central axis of the bead.

5. The method of preparing a vehicle panel assembly according to claim 2, wherein directing a gaseous stream includes localizing the gaseous stream on a peripheral portion of the substrate to cool the substrate.

6. The method of preparing a vehicle panel assembly according to claim 5, wherein localizing includes blowing the gaseous stream on the peripheral portion with a knife edge blower.

7. The method of preparing a vehicle panel assembly according to claim 1, further comprising balancing the heating and the cooling to ensure that the central core portion at least reaches its heat activation temperature while cooling the substrate below 250° F. within a period of less than fifteen minutes after heating.

8. The method of preparing a vehicle panel assembly according to claim 7, wherein balancing includes heating the central core portion of the bead to at least a heat activated temperature in a range of 5 seconds to 10 minutes and cooling the substrate temperature below 120° F. within a period of about two minutes after heating.

9. The method of preparing a vehicle panel assembly according to claim 1, further comprising balancing the heat on the first side and the heat on the second side to heat the central core portion to at least a heat activation temperature in a range of about 50° C. to 160° C. while maintaining an outer skin surface temperature at least no more than about 40° C. greater than the central core portion temperature and cooling the substrate temperature below 120° F. within a period of less than fifteen minutes after heating.

10. The method of preparing a vehicle panel assembly according to claim 1, wherein heating the first side of the substrate includes heating with shortwave infrared radiation.

11. The method of preparing a vehicle panel assembly according to claim 1, wherein heating the outer skin portion includes heating with longwave infrared radiation.

12. The method of preparing a vehicle panel assembly according to claim 11, wherein heating with longwave infrared radiation includes heating with a thermal mass temperature in a range of about 450° F. to 900° F.

13. The method of preparing a vehicle panel assembly according to claim 12, wherein said heating with longwave infrared radiation includes heating with a thermal mass temperature in a range of about 500° F. to 750° F.

14. The method of preparing a vehicle panel assembly according to claim 11, wherein cooling includes initiating the cooling after the adhesive has reached a heat activation temperature.

15. The method of preparing a vehicle panel assembly according to claim 14, wherein cooling includes directing air to the peripheral portion of the substrate.

16. The method of preparing a vehicle panel assembly according to claim 15, wherein directing includes blowing air onto the peripheral portion of the substrate.

17. The method of preparing a vehicle panel assembly according to claim 16, wherein blowing air includes localizing the air on the peripheral portion of the substrate.

18. The method of preparing a vehicle panel assembly according to claim 15, wherein heating the first side of the substrate includes heating with shortwave infrared radiation.

19. The method of preparing a vehicle panel assembly according to claim 18, wherein heating with shortwave infrared radiation includes heating with shortwave radiation having a peak emission of less than about 2.5 microns.

20. The method of preparing a vehicle panel assembly according to claim 18, further comprising directing the shortwave infrared radiation onto a portion of the substrate on the first side of the substrate aligned with the bead.

21. The method of preparing a vehicle panel assembly according to claim 15, wherein heating the outer skin of portion of the bead includes localizing the heating on the outer skin portion of the bead.

22. The method of preparing a vehicle panel assembly according to claim 21, wherein heating with longwave infrared radiation includes heating with a thermal mass in a range of about 450° F. to 900° F.

23. The method of preparing a vehicle panel assembly according to claim 14, further comprising balancing the cooling and the heating whereby the bead is heated to its heat activation temperature and the substrate of the vehicle panel is cooled to a temperature below 250° F. within a period of less than fifteen minutes after the core portion reaches the heat activation temperature.

24. The method of preparing a vehicle panel assembly according to claim 1, further including initiating the cooling within a range of about 0 to 5 minutes after heating.

25. The method of preparing a vehicle panel assembly according to claim 1, wherein heating the first side of the substrate and heating the outer skin portion of the bead are substantially simultaneous.

26. The method of preparing a vehicle panel assembly according to claim 1, wherein one of heating the first side of the substrate and heating the outer skin portion of the bead is initiated after the other of the heating the first side of the panel and heating the outer skin of the bead.

27. The method of preparing a vehicle panel assembly according to claim 1, wherein heating the outer skin portion includes localizing heat on the bead of ready-to-install heat activated adhesive.

28. The method of preparing a vehicle panel assembly according to claim 27, whereby localizing includes providing a heat localizer having reflective sides, said reflective sides directing the heat on the bead.

29. The method of preparing a vehicle panel assembly according to claim 1, wherein heating the first side includes heating a portion of the first side of the substrate aligned with the bead.

30. The method of preparing a vehicle panel assembly according to claim 1, wherein the substrate includes a gasket, and heating the first side includes heating a portion of the first side of the substrate offset from the bead, the portion being adjacent the gasket.

31. The method of preparing a vehicle panel assembly for attaching the vehicle panel assembly to a vehicle, the vehicle panel assembly having a substrate and a bead of the heat activated adhesive, the substrate having first and second sides and a peripheral portion, the peripheral portion including a gasket formed thereon, the gasket extending over at least a portion of the second side of the substrate, and the bead of ready-to-install heat activated adhesive being applied to the gasket, the bead including an interface portion on the gasket, a central core portion, and an outer skin portion, said method comprising the steps of:

heating the first side of the substrate adjacent the gasket whereby the substrate heats the gasket to heat the interface portion of the bead; and heating the outer skin portion of the bead to thereby heat the central core portion of the bead and activate the ready-to-install heat activated adhesive.

32. The method of preparing a vehicle panel assembly according to claim 31, further comprising cooling the substrate after heating the first side of the substrate and heating the outer skin portion of the bead.

33. The method of preparing a vehicle panel assembly according to claim 32, wherein cooling includes cooling the substrate after the ready-to-install heat activated adhesive is activated.

34. The method of preparing a vehicle panel assembly according to claim 32, wherein cooling includes cooling the substrate within a range of about 0 to 5 minutes after heating the first side of the substrate and heating the outer skin portion of the bead.

35. The method of preparing a vehicle panel assembly according to claim 32, wherein cooling includes directing air onto the substrate to cool the substrate.

36. The method of preparing a vehicle panel assembly according to claim 35, wherein directing air includes directing air onto the peripheral portion of the substrate.

37. The method of preparing a vehicle panel assembly according to claim 36, wherein directing air onto the peripheral portion includes directing air onto the peripheral portion at an angle in a range of approximately 0° to 85° from a central axis of the bead.

38. The method of preparing a vehicle panel assembly according to claim 32, wherein cooling includes blowing air with one of an air knife air blower assembly and a turbo fan.

39. The method of preparing a vehicle panel assembly according to claim 32, wherein cooling includes cooling the substrate to a temperature of 120° F. or less within a period of two minutes or less after heating.

40. The method of preparing a vehicle panel assembly according to claim 31, wherein heating the first side of the substrate includes directing the heat onto a portion being offset from the bead of adhesive.

41. The method of preparing a vehicle panel assembly according to claim 40, wherein heating the outer skin portion of the bead includes localizing the heat on the bead to protect the gasket from the heat.

42. The method of preparing a vehicle panel assembly according to claim 31, wherein heating at least a portion of the first side includes heating with shortwave infrared radiation.

43. The method of preparing a vehicle panel assembly according to claim 42, wherein heating the outer skin portion includes heating with longwave infrared radiation.

44. A method of preparing a vehicle panel assembly for attaching to a vehicle, the vehicle panel assembly having a substrate and a bead of ready-to-install heat activated adhesive, the substrate including first and second sides and a peripheral portion, and the bead being provided on the second side of the substrate and including a central core portion, an outer skin portion and an interface portion on the second side of the substrate, said method comprising the steps of:

heating the substrate with a shortwave radiation source thereby heating the bead with the substrate through the interface portion of the bead;

heating the bead with a source of longwave infrared radiation whereby the core of the bead at least reaches an activation temperature; and cooling the substrate after heating the bead thereby permitting handling of the vehicle panel assembly after the bead of adhesive is activated.

45. The method of preparing a vehicle panel assembly according to claim 44, further comprising balancing the heating and the cooling such that the core of the bead of adhesive reaches its activation temperature and the substrate is cooled to a temperature of 120° F. or less within a period of five minutes or less after heating.

46. The method of preparing a vehicle panel assembly according to claim 45, wherein heating the substrate includes localizing the heat from the shortwave infrared radiation source onto a portion of the first side of the substrate.

47. The method of preparing a vehicle panel assembly according to claim 44, wherein heating the bead includes localizing the heat from the longwave infrared radiation source onto the outer skin portion of the bead.

48. The method of preparing a vehicle panel assembly according to claim 44, wherein cooling includes blowing a gaseous stream onto the peripheral portion of the substrate.

49. The method of preparing a vehicle panel assembly according to claim 44, further comprising initiating the cooling within five minutes or less after heating.

50. The method of preparing a vehicle panel assembly according to claim 44, further comprising initiating the cooling within five minutes or less of the core portion of the bead reaching its activation temperature.

51. The method of preparing a vehicle panel assembly according to claim 46, wherein localizing includes localizing the heat on a portion of the first side of the substrate which is generally aligned with the bead.

52. The method of preparing a vehicle panel assembly according to claim 44, wherein heating the substrate includes positioning at least one heating lamp spaced from the first side of the substrate over the portion of the substrate and aligning the lamp with a central axis of the bead.

53. The method of preparing a vehicle panel assembly according to claim 52, wherein positioning includes spacing the lamp at a distance of less than twenty-four inches from the first side of the substrate.

54. The method of preparing a vehicle panel assembly according to claim 44, wherein heating the bead includes positioning the source of longwave radiation spaced from the second side of the substrate.

55. The method of preparing a vehicle panel assembly according to claim 54, wherein positioning includes spacing the source of longwave infrared radiation less than about twenty-four inches from the second side of the substrate.

56. The method of preparing a vehicle panel assembly according to claim 44, wherein said heating the substrate and heating the bead is substantially simultaneous.

* * * * *